US012091278B2

(12) United States Patent
Taniguchi

(10) Patent No.: US 12,091,278 B2
(45) Date of Patent: *Sep. 17, 2024

(54) PRINTING APPARATUS AND CONTROL METHOD THEREOF

(71) Applicant: CANON KABUSHIKI KAISHA, Tokyo (JP)

(72) Inventor: Hisashi Taniguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,801

(22) Filed: Jun. 28, 2022

(65) Prior Publication Data

US 2022/0324666 A1 Oct. 13, 2022

Related U.S. Application Data

(63) Continuation of application No. 16/508,958, filed on Jul. 11, 2019, now Pat. No. 11,396,435.

(30) Foreign Application Priority Data

Jul. 17, 2018 (JP) ................................ 2018-134475

(51) Int. Cl.
*B65H 5/06* (2006.01)
*B41J 3/60* (2006.01)
*B41J 13/00* (2006.01)

(52) U.S. Cl.
CPC ................ *B65H 5/062* (2013.01); *B41J 3/60* (2013.01); *B41J 13/0009* (2013.01); *B65H 2513/42* (2013.01)

(58) Field of Classification Search
CPC ........ B65H 5/062; B65H 2513/42; B41J 3/60; B41J 13/0009
See application file for complete search history.

(56) References Cited

U.S. PATENT DOCUMENTS 8,277,016 B2 10/2012 Moriyama et al.
9,427,985 B2 8/2016 Taniguchi et al.
2003/0063936 A1 4/2003 Sasaki et al.
(Continued)

FOREIGN PATENT DOCUMENTS

JP 2010-275085 A 12/2010
JP 2020-011806 A 1/2020

OTHER PUBLICATIONS

Office Action dated Nov. 24, 2023, in Japanese Patent Application No. 2022-162663.

*Primary Examiner* — David H Banh
(74) *Attorney, Agent, or Firm* — Venable LLP

(57) ABSTRACT

A printing apparatus, in a case of performing double-sided printing on a plurality of sheets, performs an overlap reversing operation by controlling a first sheet to stay in a reversing path to position at least a trailing edge of the first sheet relative to a second direction in a conveying path when conveying the first sheet to the reversing path after completion of a printing operation on a first surface of the first sheet, and controls the reversing roller to convey the first sheet and a second sheet fed by a feed roller next to the first sheet, in a state in which the first sheet in the reversing path and a leading edge of the second sheet relative to the second direction overlap each other, after completion of the printing operation on a first surface of the second sheet.

17 Claims, 27 Drawing Sheets

(56) References Cited

U.S. PATENT DOCUMENTS

| | | | | |
|---|---|---|---|---|
| 2010/0302298 | A1* | 12/2010 | Moriyama | B41J 3/60<br>271/3.14 |
| 2011/0211224 | A1 | 9/2011 | Arita | |
| 2012/0205855 | A1 | 8/2012 | Cook | |
| 2015/0015656 | A1 | 1/2015 | Moriyama | |
| 2016/0052311 | A1 | 2/2016 | Taniguchi et al. | |

* cited by examiner

PRINTING APPARATUS AND CONTROL METHOD THEREOF

BACKGROUND OF THE INVENTION

Field of the Invention

The present invention relates to a printing apparatus and a control method thereof.

Description of the Related Art

Recently, double-sided printing is actively used in a printing apparatus for effective use of sheets. For higher productivity, quicker printing is expected. Conventionally, a method as disclosed in Japanese Patent Laid-Open No. 2010-275085 is proposed for a printing apparatus as an arrangement for reversing a sheet member to perform quick and double-sided printing. In Japanese Patent Laid-Open No. 2010-275085, a reversing conveying path is provided in a printing apparatus. When a sheet is shorter than the reversing conveying path and a preceding sheet is to be reversed after the end of printing the first surface of the preceding sheet, the preceding sheet is stopped to stay in the reversing conveying path. While the preceding sheet stays, the first surface of a succeeding sheet is printed.

However, in Japanese Patent Laid-Open No. 2010-275085, there is a restriction in which the length of a sheet for which a printing mode of stopping a sheet to stay in the reversing conveying path and performing double-sided printing is executable must be at least ½ or less of a path length necessary for reversing conveyance. In this case, when a regularly used sheet length is larger than ½ of a print sheet length of a maximum size, the regularly used sheet cannot receive the benefit from high throughput given by the above-mentioned arrangement. Alternatively, the throughput decreases and the apparatus sizes up at a maximum size owing to a path length larger than the path length necessary for the reversing operation on a sheet of the maximum size.

SUMMARY OF THE INVENTION

The present invention has been made in consideration of the above problems, and achieves both high throughput of double-sided printing and a small apparatus size in a printing apparatus capable of double-sided printing on a sheet.

According to one aspect of the present invention, there is provided a printing apparatus including: a feed roller configured to feed a sheet; a conveying roller configured to convey the sheet fed by the feed roller in a first direction; a printing unit configured to print on the sheet conveyed by the conveying roller; a conveying path arranged between the feed roller and the conveying roller; a reversing path connected to the conveying path and configured to reverse a sheet to be conveyed in a second direction opposite to the first direction by the conveying roller; and a reversing roller arranged in the reversing path, the apparatus comprising: a control unit configured to, in a case of performing double-sided printing on a plurality of sheets, perform an overlap reversing operation by controlling a first sheet to stay in the reversing path to position at least a trailing edge of the first sheet in the second direction in the conveying path when conveying the first sheet to the reversing path by the conveying roller after completion of a printing operation on a first surface of the first sheet, and controlling the reversing roller to convey the first sheet and a second sheet fed by the feed roller next to the first sheet, in a state in which the first sheet staying in the reversing path and a leading edge of the second sheet in the second direction overlap each other, after completion of the printing operation on a first surface of the second sheet.

According to another aspect of the present invention, there is provided a method of controlling a printing apparatus including a feed roller configured to feed a sheet, a conveying roller configured to convey the sheet fed by the feed roller in a first direction, a printing unit configured to print on the sheet conveyed by the conveying roller, a conveying path arranged between the feed roller and the conveying roller, a reversing path connected to the conveying path and configured to reverse a sheet to be conveyed in a second direction opposite to the first direction by the conveying roller, and a reversing roller arranged in the reversing path, the method comprising: in a case of performing double-sided printing on a plurality of sheets, controlling a first sheet to stay in the reversing path to position at least a trailing edge of the first sheet in the second direction in the conveying path when conveying the first sheet to the reversing path by the conveying roller after completion of a printing operation on a first surface of the first sheet, and controlling the reversing roller to convey the first sheet and a second sheet fed by the feed roller next to the first sheet, in a state in which the first sheet staying in the reversing path and a leading edge of the second sheet in the second direction overlap each other, after completion of the printing operation on a first surface of the second sheet.

According to the present invention, both high throughput of double-sided printing and a small apparatus size can be achieved in a printing apparatus capable of double-sided printing on a sheet.

Further features of the present invention will become apparent from the following description of exemplary embodiments (with reference to the attached drawings).

DESCRIPTION OF THE EMBODIMENTS

First Embodiment

Figure 1:
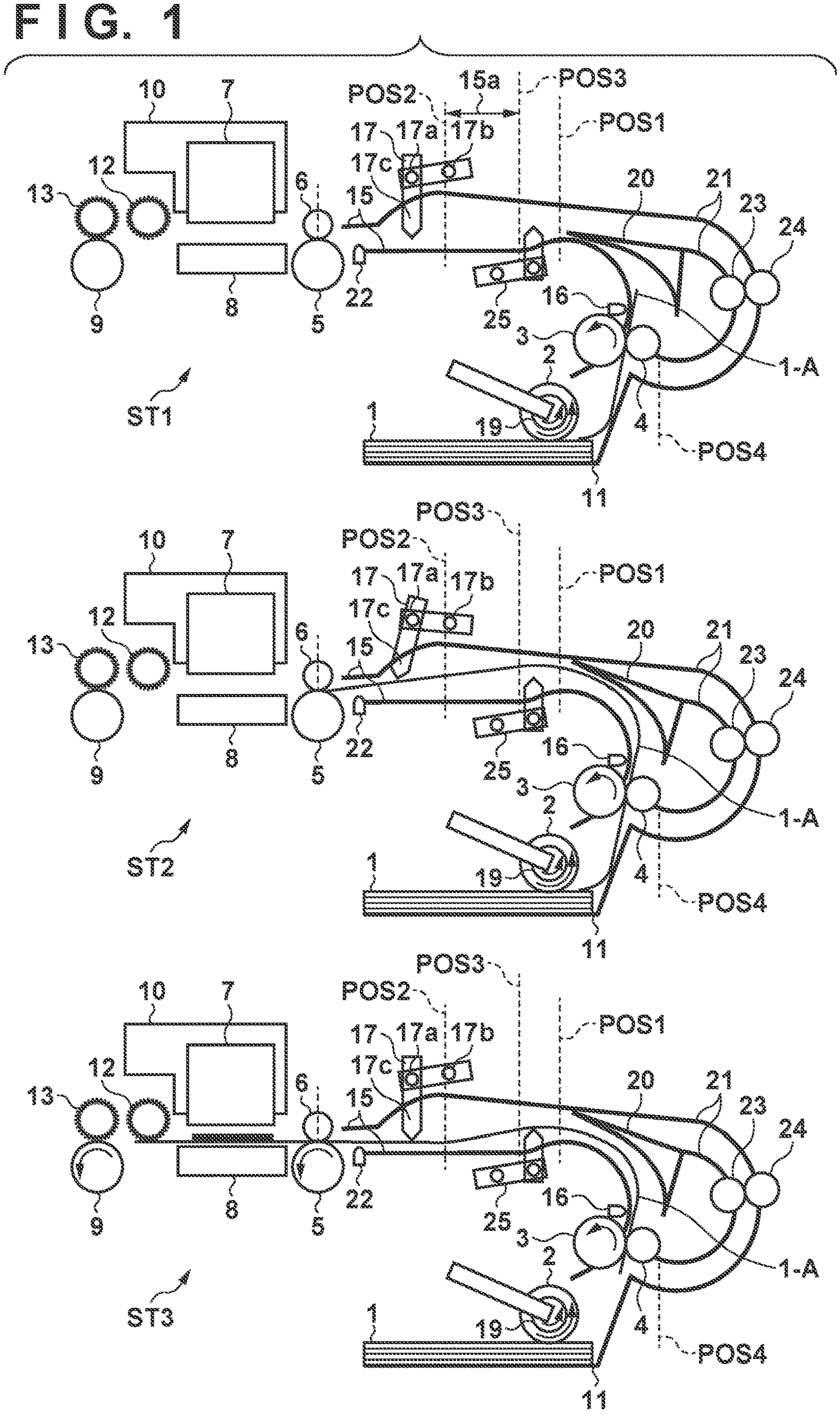
FIG. 1 is a view for explaining a multiple double-sided printing operation by a printing apparatus according to the present invention.

An embodiment of the present invention will now be described in detail with reference to the accompanying drawings. FIGS. 1 to 12 are sectional views for explaining a double-sided printing operation by a printing apparatus according to the embodiment of the present invention. First, the schematic arrangement of the printing apparatus according to this embodiment will be described with reference to FIG. 1.

(Outline of Apparatus)

The printing apparatus according to this embodiment uses a sheet 1 as a print medium such as paper. In the following description, the size of a regularly used sheet in the printing apparatus is A4 size, and the maximum size is A3 size. In ST1 of FIG. 1, a plurality of sheets 1 are stacked on a feed tray 11 (stacking unit). A pickup roller 2 comes into contact with the top sheet 1 stacked on the feed tray 11 and picks it up. A feed roller 3 feeds the sheet 1 picked up by the pickup roller 2 downstream in a sheet conveying direction. A feed driven roller 4 is biased to the feed roller 3, and clamps and feeds the sheet 1 together with the feed roller 3. A conveying roller 5 conveys the sheet 1 fed by the feed roller 3 and the feed driven roller 4 to a position where the sheet 1 faces a printhead 7. A pinch roller 6 is biased to the conveying roller 5, and clamps and conveys the sheet 1 together with the conveying roller 5.

The printhead 7 prints at a predetermined printing position on the sheet 1 conveyed by the conveying roller 5 and the pinch roller 6. In this embodiment, the printhead 7 is an inkjet printhead configured to print on the sheet 1 by discharging ink from the printhead 7. However, the present invention is not limited to this method and may be applied to an electrophotographic printing apparatus. The present invention may also be applied to a conveying apparatus connected to a printing apparatus or the like. A platen 8 supports the second surface of the sheet 1 at the position where the sheet 1 faces the printhead 7. A carriage 10 supports the printhead 7 and moves in a direction crossing (perpendicular to) the sheet conveying direction. Although a serial arrangement using the carriage 10 will be exemplified in this embodiment, the present invention is not limited to this arrangement. For example, when a full-line printhead is used, the carriage 10 is unnecessary.

A discharge roller 9 discharges the sheet 1 printed by the printhead 7 outside the apparatus. Spurs 12 and 13 rotate in contact with the print surface of the sheet 1 printed by the printhead 7. The spur 13 on the downstream side in the conveying direction is biased to the discharge roller 9. For the spur 12 on the upstream side in the conveying direction, the discharge roller 9 is not arranged at an opposite position. The spur 12 prevents the floating of the sheet 1 and is also called a pressing spur.

The sheet 1 is guided by a conveying guide 15 and a flapper 20 between a feed nip formed by the feed roller 3 and the feed driven roller 4 and a conveying nip formed by the conveying roller 5 and the pinch roller 6. The conveying guide 15 defines a conveying path from the feed tray 11 to a printing position where the printhead 7 is provided. The flapper 20 is pivotal by the reaction force of the sheet 1 conveyed by the feed roller 3. A sheet sensor 16 detects the leading and trailing edges of the sheet 1. The leading edge and the trailing edge are an edge of one sheet that is detected first by the sheet sensor 16 and an edge detected later, respectively. That is, the leading and trailing edges are determined relatively in the conveying direction. The sheet sensor 16 is provided on the downstream side of the feed roller 3 in the sheet conveying direction. An area 15*a* between POS2 and POS3 of the conveying guide 15 is an area where a preceding first sheet and a succeeding second sheet overlap each other at the time of stay double-sided printing according to this embodiment, and is provided within the conveying guide 15 on the conveying path. In this embodiment, an inter-guide distance in the area 15*a* is larger than that in the remaining area of the conveying guide 15. The inter-guide distance is a distance between wall surfaces constituting the conveying guide 15 and is equivalent to, for example, a vertical length in FIG. 1. Note that a length of the area 15*a* in the conveying direction is not particularly limited. However, such a length is set so as not to cause a shift, cancellation of overlapping, or the like at the time of conveyance in an overlapping state according to this embodiment. The length may be determined in accordance with the arrangement of the printing apparatus and the type of conveyable paper. Details of stay double-sided printing will be described later. Here, "first" and "second" represent the relationship (preceding and succeeding) between conveyed sheets and do not indicate specific sheets. In the following description, when double-sided printing is performed on one sheet, a surface to be printed first is described as "first surface" and a surface to be printed later is described as "second surface". This does not particularly limit the obverse and reverse of a sheet.

A sheet pressing lever 17 is a member configured to make the leading edge of the reversed second sheet overlap the trailing edge of the reversed first sheet. The sheet pressing lever 17 is desirably provided near POS2 and on the downstream side (left in FIG. 1) in the conveying direction. With this arrangement, the sheet pressing lever 17 can bias the leading edge of the reversed second sheet down in FIG. 1 to ensure a space for the trailing edge of the staying reversed first sheet. The sheet pressing lever 17 is biased by a spring counterclockwise in FIG. 1 about a rotating shaft 17*b* in a state illustrated as a neutral point, and a distal end 17*c* of the sheet pressing lever 17 that comes into contact with the sheet 1 is biased by the spring clockwise in FIG. 1 about a rotating shaft 17*a*. Note that the shape of the sheet pressing lever 17 is not limited to one shown in FIG. 1, and can employ another shape as long as it has the same function. For example, the number of rotating shafts or the shape of the distal end may be changed. A second sheet pressing lever 25 is a member configured to lift the trailing edge of the staying reversed first sheet. The second sheet pressing lever 25 is desirably arranged near POS3 and on the upstream side in the conveying direction. With this arrangement, the second sheet pressing lever 25 can bias the trailing edge of the reversed first sheet up in FIG. 1 to ensure a space for the trailing edge of the reversed second sheet. In this embodiment, the orientation (direction in which an external force is applied) of biasing the sheet 1 by the sheet pressing lever 17 and the orientation of biasing the sheet 1 by the second sheet pressing lever 25 are opposite. Note that the shape of the second sheet pressing lever 25 is not limited to one shown in FIG. 1, and can employ another shape as long as it has the same function.

A second sheet sensor 22 is a sensor configured to detect the leading and trailing edges of the sheet 1, and detects a timing when the leading edge of the sheet 1 enters the conveying nip formed by the conveying roller 5 and the pinch roller 6, and a timing when the trailing edge of the sheet 1 during the printing operation leaves the conveying nip. A reversing conveying guide 21 is a reversing conveying guide of a reversing portion configured to reverse the sheet 1. The reversing conveying guide 21 guides, to the feed nip formed by the feed roller 3 and the feed driven roller 4, the sheet 1 conveyed (reversely conveyed) upstream in the conveying direction by the conveying roller 5. That is, the reversing conveying guide 21 defines a reversing path used to reverse the sheet 1. A reversing roller 23 conveys the sheet 1 to be reversed. A reversing driven roller 24 is biased to the reversing roller 23, and clamps and feeds the sheet 1 together with the reversing roller 23.

(Pickup Roller)

Figure 13A:
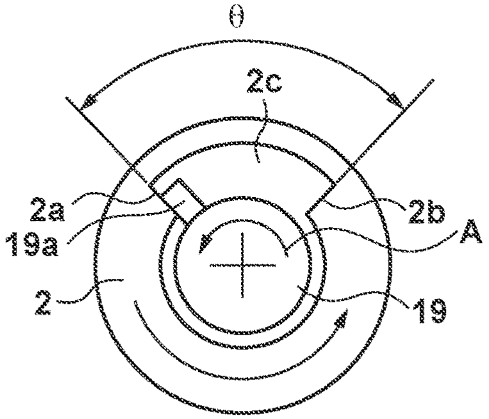
FIGS. 13A and 13B are views showing an example of the arrangement of a pickup roller according to the present invention.
Figure 13B:
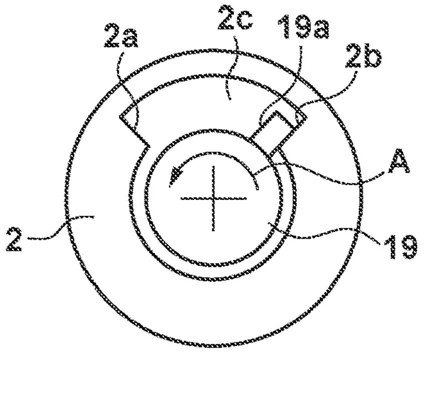

FIGS. 13A and 13B are sectional views for explaining an example of the arrangement of the pickup roller 2 according to this embodiment. As described above, the pickup roller 2 comes into contact with the top sheet 1 stacked on the feed tray 11 and picks it up. A driving shaft 19 is configured to transmit the driving of a feed motor (to be described later) to the pickup roller 2. When picking up the sheet 1, the driving shaft 19 and the pickup roller 2 rotate in a direction indicated by an arrow A in FIGS. 13A and 13B. A case is exemplified in which the conveying direction of the sheet 1 is the right side of the pickup roller 2, as shown in FIG. 1. The driving shaft 19 has a projection 19*a*. A recess 2*c* in which the projection 19*a* fits is formed in the pickup roller 2. The recess 2*c* is formed at a central angle θ in the pickup roller 2.

When the projection 19*a* contacts a first surface 2*a* of the recess 2*c* of the pickup roller 2, as shown in FIG. 13A, the driving of the driving shaft 19 is transmitted to the pickup roller 2, and the driving shaft 19 is driven to rotate the pickup roller 2. To the contrary, when the projection 19*a* contacts a second surface 2*b* of the recess 2*c* of the pickup roller 2, as shown in FIG. 13B, the driving of the driving shaft 19 is not transmitted to the pickup roller 2, and even if the driving shaft 19 is driven, the pickup roller 2 does not rotate. Also, when the projection 19*a* contacts neither the first surface 2*a* nor the second surface 2*b* and exists between the first surface 2*a* and the second surface 2*b*, even if the driving shaft 19 is driven, the pickup roller 2 does not rotate.

(Hardware Arrangement)

Figure 14:
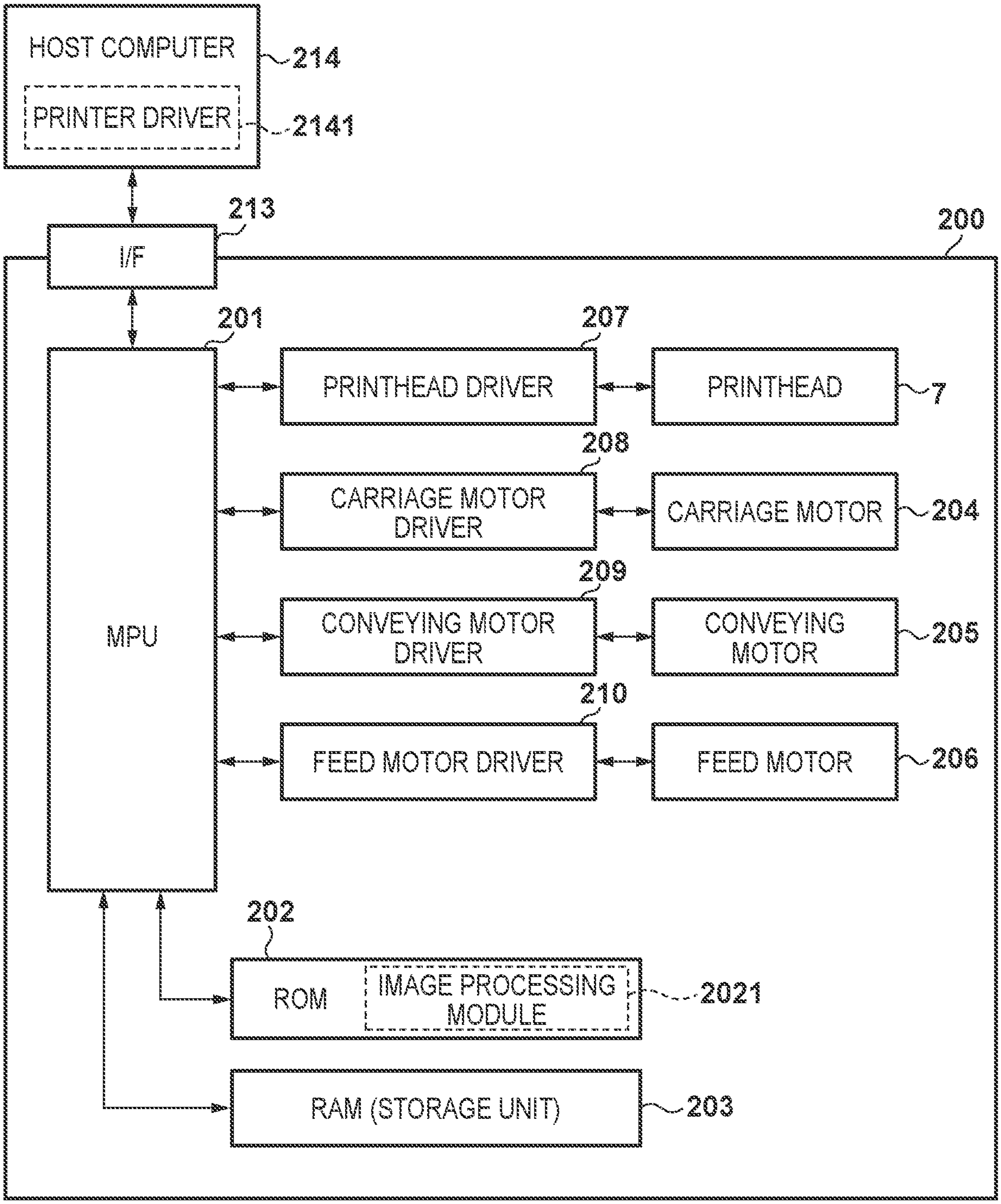
FIG. 14 is a block diagram showing an example of the arrangement of the printing apparatus according to the present invention.

FIG. 14 is a block diagram showing an example of the hardware arrangement of a printing apparatus 200 according to this embodiment. An MPU (Micro Processing Unit) 201 controls the operations of respective units, data processing, and the like in the printing apparatus 200. A ROM (Read Only Memory) 202 is a nonvolatile storage area where programs to be executed by the MPU 201 and data are stored. The ROM 202 has, as an image processing module 2021, a program for performing image processing on a print image. A RAM (Random Access Memory) 203 is a volatile storage area where processing data to be executed by the MPU 201 and data received from a host computer 214 are temporarily stored.

A printhead driver 207 controls the printhead 7. A carriage motor driver 208 controls a carriage motor 204 configured to drive the carriage 10. A conveying motor 205 drives the conveying roller 5 and the discharge roller 9. A conveying motor driver 209 controls the conveying motor 205. A feed motor 206 drives the pickup roller 2, the feed roller 3, and the reversing roller 23. A feed motor driver 210 controls the feed motor 206. The pickup roller 2, the feed roller 3, and the reversing roller 23 can be driven independently by driving switching mechanisms (not shown).

An I/F 213 is an interface for connecting the printing apparatus 200 and an external apparatus so that they can communicate with each other. In the example of FIG. 14, the printing apparatus 200 and the host computer 214 serving as an external apparatus are connected via the I/F 213. The host computer 214 is, for example, an information processing apparatus such as a PC (Personal Computer). The host computer 214 includes a printer driver 2141 for, when a user inputs an instruction to execute a printing operation, collecting a print image and pieces of print information such as print image quality and communicating with the printing apparatus 200. The MPU 201 executes exchange of a print image and the like with the host computer 214 via the I/F 213.

[Double-Sided Printing Operation]

A double-sided printing operation for three successive sheets 1 of regularly used A4 size will be described in time series with reference to FIGS. 1 to 12 (ST1 to ST37). In this embodiment, stay double-sided printing is possible only for regularly used A4 size or letter size. When print data is transmitted from the host computer 214 via the I/F 213, it is processed by the MPU 201 and rasterized in the RAM 203. The MPU 201 starts the printing operation based on the rasterized data. The print data designates image data to be printed, the setting of paper used for printing, the presence/absence of double-sided printing, and the like. Note that a rotational direction and sheet conveying direction to be described below are based on the arrangement shown in the drawings. When the arrangement or a paper size at which stay double-sided printing is possible changes, the rotational direction and the sheet conveying direction also change depending on the purpose of the arrangement and operation.

(Multiple Double-Sided Printing)

Multiple double-sided printing will be explained with reference to ST1 of FIG. 1. First, the feed motor driver 210 drives the feed motor 206 at a low speed. At this time, the pickup roller 2 is rotated at 7.6 inches/sec in this embodiment. The rotating pickup roller 2 picks up the top sheet (first sheet 1-A) stacked on the feed tray 11. The first sheet 1-A picked up by the pickup roller 2 is conveyed by the feed roller 3 rotating in the same direction as the pickup roller 2. The feed roller 3 is also driven by the feed motor 206. This embodiment will be explained using an example of an arrangement including the pickup roller 2 and the feed roller 3. Note that an arrangement including only the feed roller configured to feed the sheets 1 stacked on a stacking member such as the feed tray 11 is also applicable.

When the sheet sensor 16 provided on the downstream side of the feed roller 3 in the conveying direction detects the leading edge of the first sheet 1-A, the feed motor 206 is switched to high-speed driving. At this time, the pickup roller 2 and the feed roller 3 rotate at 20 inches/sec in this embodiment.

The multiple double-sided printing is explained with reference to ST2 of FIG. 1. As the feed roller 3 keeps rotating, the leading edge of the first sheet 1-A pushes away the flapper 20 against the weight of the flapper 20, and rotates the sheet pressing lever 17 clockwise about the rotating shaft 17*b* against the biasing force of the spring. As the feed roller 3 keeps rotating, the leading edge of the first sheet 1-A hits the conveying nip formed by the conveying roller 5 and the pinch roller 6. At this time, the conveying roller 5 stands still. Even after the leading edge of the first sheet 1-A hits the conveying nip, the feed roller 3 is rotated by a predetermined amount to align the first sheet 1-A and correct the skew in the state in which the leading edge of the first sheet 1-A hits the conveying nip. The skew correction operation is also called a registration operation.

The multiple double-sided printing is explained with reference to ST3 of FIG. 1. After the end of the skew correction operation on the first sheet 1-A, the conveying motor 205 is driven to start rotating the conveying roller 5 counterclockwise in FIG. 1. At this time, the conveying roller 5 conveys the sheet 1 at 15 inches/sec in this embodiment. After the first sheet 1-A is aligned with a position where it faces the printhead 7, the printing operation is performed by discharging ink from the printhead 7 based on print data. Note that the alignment operation is performed by causing the leading edge of the sheet 1 to hit the conveying nip and temporarily position the leading edge at the position of the conveying roller 5, and then controlling the rotation amount of the conveying roller 5 using the position of the conveying roller 5 as a reference.

As described above, the printing apparatus according to this embodiment is a serial printing apparatus in which the printhead 7 is mounted on the carriage 10. The printing apparatus repeats a conveying operation of conveying the sheet 1 by the conveying roller 5 intermittently by a predetermined amount, and an image forming operation of discharging ink from the printhead 7 while moving the carriage 10 supporting the printhead 7 when the conveying roller 5 stops. Accordingly, the printing apparatus performs the printing operation on the sheet 1.

Figure 2:
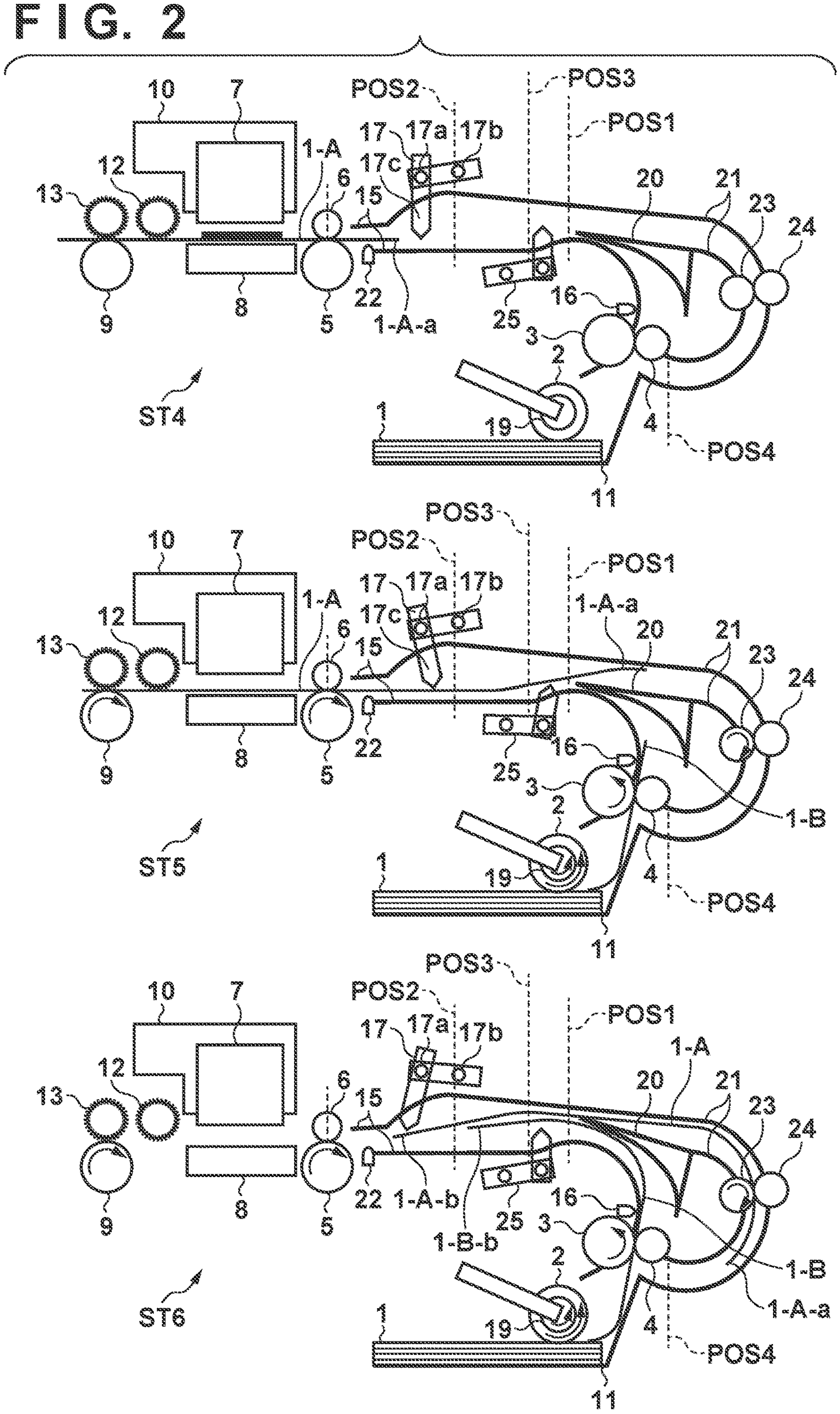
FIG. 2 is a view for explaining the multiple double-sided printing operation by the printing apparatus according to the present invention.

The multiple double-sided printing is explained with reference to ST4 of FIG. 2. After the end of the printing operation on the first sheet 1-A, the rotation of the conveying roller 5 and discharge roller 9 is stopped. At this time, the flapper 20 is moved down owing to its weight, as shown in FIG. 2. That is, the flapper 20 is not pushed up by the sheet 1.

The multiple double-sided printing is explained with reference to ST5 of FIG. 2. The conveying roller 5 and the discharge roller 9 rotate in a direction (clockwise in FIG. 2) opposite to that in the printing operation, and convey the first sheet 1-A toward the conveying guide 15 and the sheet pressing lever 17. At this time, the conveying roller 5 rotates at 8 inches/sec in this embodiment. As the conveying roller 5 keeps rotating clockwise in FIG. 2, an edge 1-A-a (trailing edge at the time of printing on the first surface) of the first sheet 1-A rotates the distal end 17*c* of the sheet pressing lever 17 counterclockwise in FIG. 2 about the rotating shaft 17*a* against the biasing force of the spring. The sheet pressing lever 17 may be configured so that the edge 1-A-a of the first sheet 1-A passes below the distal end 17*c* of the sheet pressing lever 17 without contact. The edge 1-A-a of the first sheet 1-A rotates the distal end of the second sheet pressing lever 25 clockwise in FIG. 2. As the conveying roller 5 keeps rotating clockwise in FIG. 2, the edge 1-A-a of the first sheet 1-A is guided to the reversing conveying guide 21 by the second sheet pressing lever 25. Since the flapper 20 is moved down, as described above, the first sheet 1-A can be guided to the reversing conveying guide 21. At this time, the pickup roller 2 starts rotating and picks up a second sheet 1-B. The pickup operation on the second sheet 1-B is performed during the printing operation on the first sheet 1-A, and the feed roller 3 is temporarily stopped in response to detection by the sheet sensor 16. The second sheet 1-B may stand by before pushing up the flapper 20 by an edge 1-B-b (leading edge at the time of printing on the first surface) of the second sheet 1-B.

The multiple double-sided printing is explained with reference to ST6 of FIG. 2. As the conveying roller 5 keeps rotating clockwise in FIG. 2, the edge 1-A-a (trailing edge at the time of printing on the first surface) of the first sheet 1-A is guided to the reversing conveying guide 21 and enters a reversing conveying nip between the reversing roller 23 and the reversing driven roller 24. The edge 1-B-b (leading edge at the time of printing on the first surface) of the second sheet 1-B picked up by the pickup roller 2 pushes away the flapper 20 and joins the conveying guide 15. When the edge 1-B-b of the second sheet 1-B leaves the flapper 20, the edge 1-A-a of the first sheet 1-A already passed through the flapper 20 and is guided to the reversing conveying guide 21, so a paper jam by a collision between the edges of the sheets does not occur. As for the reversing conveyance of the first sheet 1-A, when an edge 1-A-b (leading edge at the time of printing on the first surface) of the first sheet 1-A leaves the second sheet sensor 22, the position of the edge 1-A-a of the first sheet 1-A is calculated based on the length information of the first sheet 1-A in the conveying direction.

Figure 3:
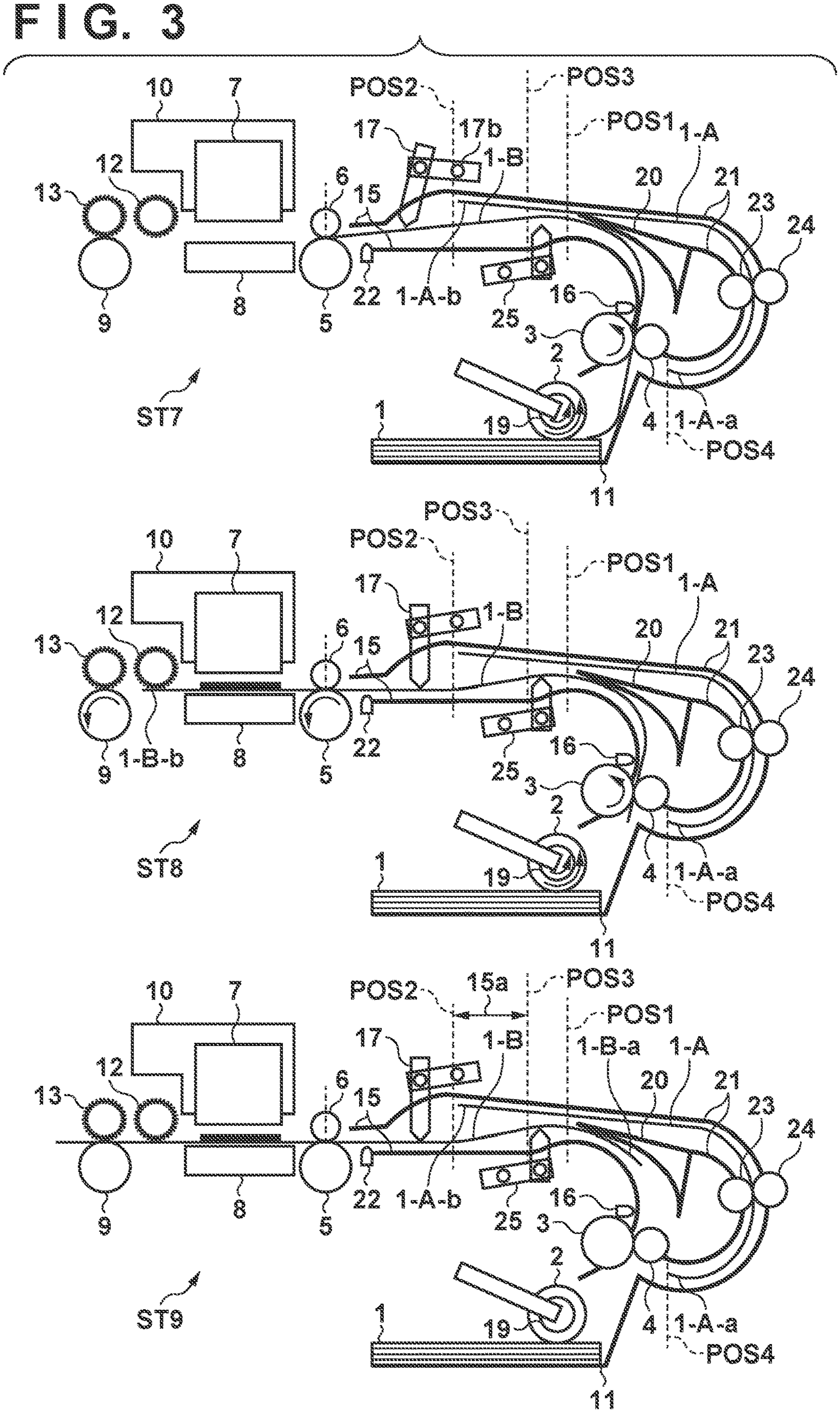
FIG. 3 is a view for explaining the multiple double-sided printing operation by the printing apparatus according to the present invention.

The multiple double-sided printing is explained with reference to ST7 of FIG. 3. The conveying roller 5 and the reversing roller 23 are rotated clockwise in FIG. 3 by a predetermined amount based on the position information of the edge 1-A-a of the first sheet 1-A. When the edge 1-A-a of the first sheet 1-A reaches POS4 in the reversing conveying guide 21, the rotation of the conveying roller 5 and reversing roller 23 is stopped. As for the second sheet 1-B, as the feed roller 3 keeps rotating counterclockwise in FIG. 3, the edge 1-B-b of the second sheet 1-B hits the conveying nip formed by the conveying roller 5 and the pinch roller 6. At this time, the conveying roller 5 stands still. Even after the edge 1-B-b of the second sheet 1-B hits the conveying nip, the feed roller 3 is rotated counterclockwise in FIG. 3 by a predetermined amount to align the second sheet 1-B and correct the skew in the state in which the edge 1-B-b of the second sheet 1-B hits the conveying nip.

The multiple double-sided printing is explained with reference to ST8 of FIG. 3. After the end of the skew correction operation on the second sheet 1-B, the conveying motor 205 is driven to start rotating the conveying roller 5 counterclockwise in FIG. 3. At this time, the conveying roller 5 conveys the sheet at 15 inches/sec in this embodiment. The second sheet 1-B is aligned with the position where it faces the printhead 7, and the printing operation is performed on the first surface of the second sheet 1-B by discharging ink from the printhead 7 based on print data. At this time, the reversing roller 23 stands still. The first sheet 1-A stops and stays in the conveying guide 15 and the reversing conveying guide 21 while being held by the reversing roller 23 and the reversing driven roller 24. The edge 1-A-b of the first sheet 1-A is positioned at POS2 in the conveying guide 15. POS2 is set on the reversing conveying guide 21 side (right in FIG. 3) with respect to the sheet pressing lever 17 in the conveying guide 15 so that the edge 1-A-b of the staying first sheet 1-A does not contact the sheet pressing lever 17.

Figure 4:
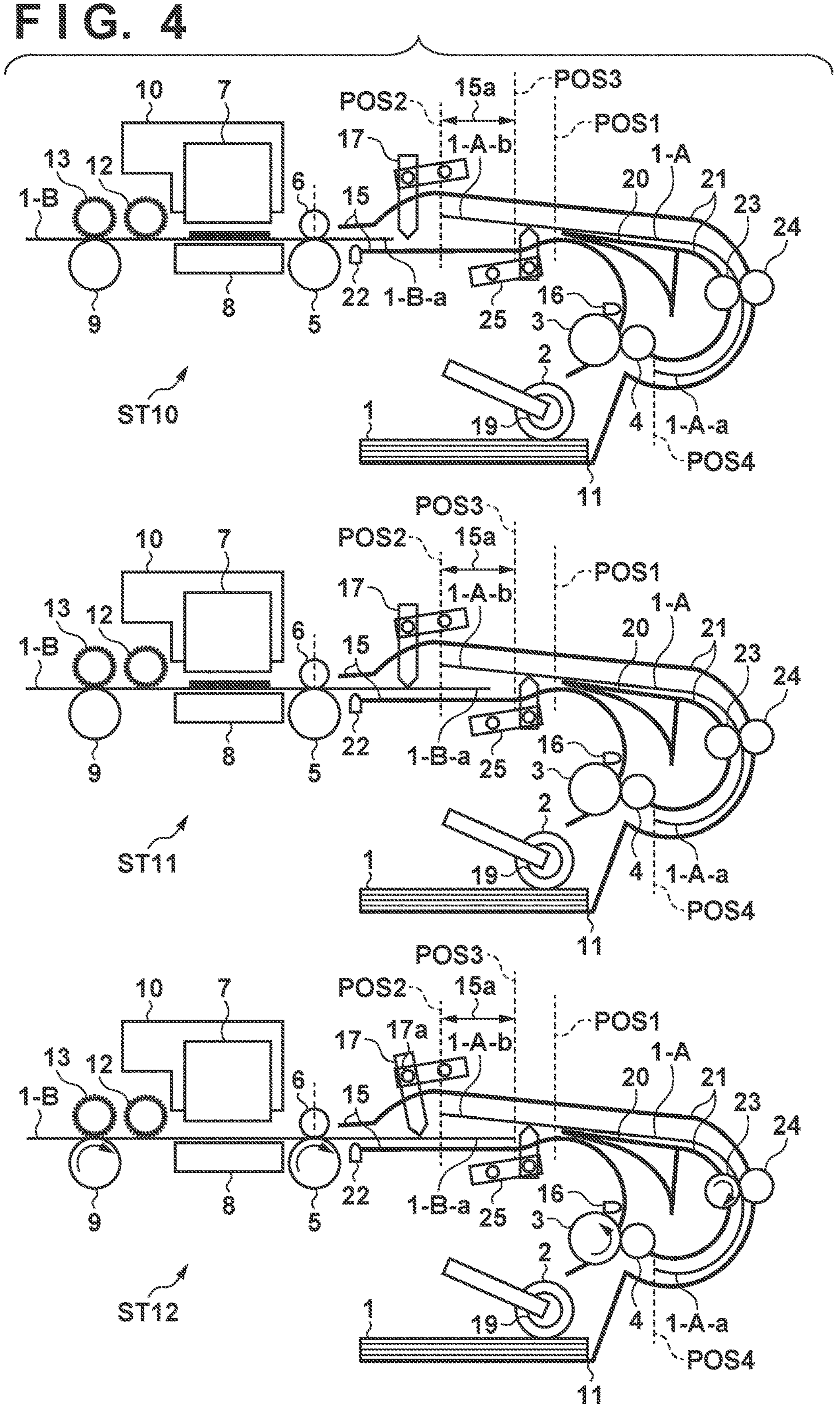
FIG. 4 is a view for explaining the multiple double-sided printing operation by the printing apparatus according to the present invention.

The multiple double-sided printing is explained with reference to ST9 of FIG. 3 to ST11 of FIG. 4. After the end of the printing operation on the first surface of the second sheet 1-B, the position of an edge 1-B-a (trailing edge at the time of printing on the first surface) of the second sheet 1-B at the end of printing is determined. When the edge 1-B-a of the second sheet 1-B is positioned upstream in the conveying direction with respect to POS3 in FIG. 3, as shown in ST9, the conveying roller 5 is rotated counterclockwise in FIG. 3 to convey the second sheet 1-B until the edge 1-B-a of the second sheet 1-B reaches POS3. As a result, the first sheet 1-A and the second sheet 1-B overlap each other between POS2 and POS3 (area 15*a*), as shown in ST12. When the edge 1-B-a of the second sheet 1-B is positioned downstream in the conveying direction with respect to POS3 in FIG. 4, as shown in ST10 or ST11 of FIG. 4, the conveying roller 5 is rotated clockwise in FIG. 4 to convey the second sheet 1-B upstream in the conveying direction. At this time, the edge 1-A-b of the first sheet 1-A is lifted up in FIG. 4 by the second sheet pressing lever 25. When the edge 1-B-a of the second sheet 1-B is positioned downstream in the conveying direction with respect to POS2 in FIG. 4, as shown in ST10, the conveying roller 5 is kept rotated and conveyed counterclockwise in FIG. 4 to apply a biasing force from the sheet pressing lever 17 to the edge 1-B-a of the second sheet 1-B and suppress the floating upward in FIG. 4. Since the edge 1-A-b of the first sheet 1-A is lifted up in FIG. 4 by the second sheet pressing lever 25, the edge 1-B-a of the second sheet 1-B can overlap the edge 1-A-b of the first sheet 1-A from below it. As a result, the first sheet 1-A and the second sheet 1-B overlap each other between POS2 and POS3 (area 15*a*), as shown in ST12.

The multiple double-sided printing is explained with reference to ST12 of FIG. 4. The edge 1-B-a of the second sheet 1-B reaches POS3 based on the position information of the edge 1-B-a of the second sheet 1-B. Along with this, the conveying roller 5 and the reversing roller 23 rotate clockwise in FIG. 4 to start conveying the second sheet 1-B and the first sheet 1-A while the edge 1-A-b of the first sheet 1-A and the edge 1-B-a of the second sheet 1-B maintain the overlapping state. Further, the multiple double-sided printing is explained with reference to ST13 of FIG. 5. While the edge of the second sheet 1-B is guided to the reversing conveying guide 21, the first sheet 1-A is nipped between the feed roller 3 and the feed driven roller 4 and conveyed to the flapper 20. As the feed roller 3 keeps rotating counterclockwise in FIG. 5, the edge 1-A-a of the first sheet 1-A pushes away the flapper 20 against the weights of the flapper 20, first sheet 1-A, and second sheet 1-B, and joins the conveying guide 15 again.

Figure 5:
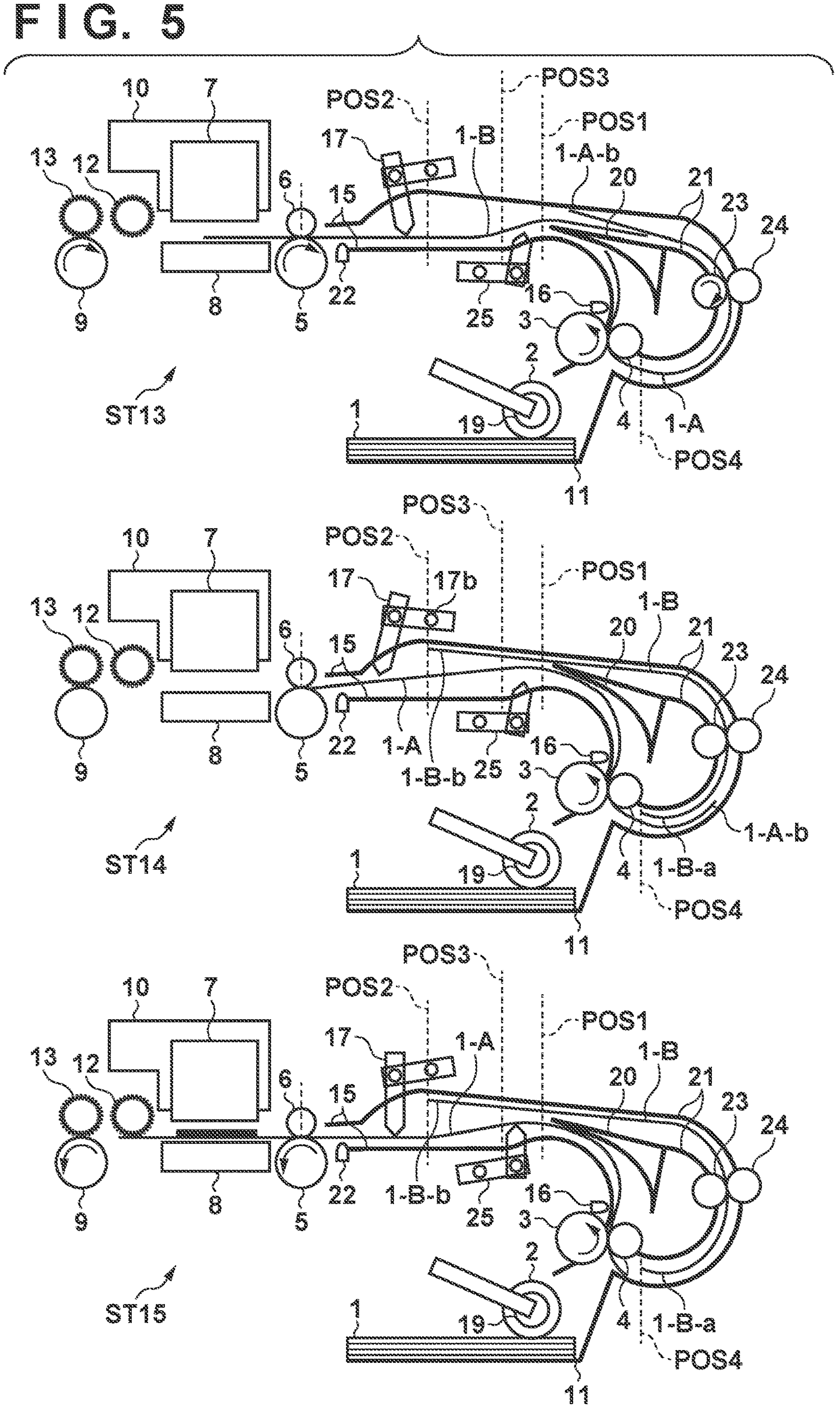
FIG. 5 is a view for explaining the multiple double-sided printing operation by the printing apparatus according to the present invention.

The multiple double-sided printing is explained with reference to ST14 of FIG. 5. When the edge 1-B-a of the second sheet 1-B reaches POS4 in the reversing conveying guide 21 by rotating the reversing roller 23 clockwise in FIG. 5, the rotation of the conveying roller 5 and reversing roller 23 is stopped. As for the first sheet 1-A, as the feed roller 3 keeps rotating counterclockwise in FIG. 5, the edge 1-A-a of the first sheet 1-A hits the conveying nip formed by the conveying roller 5 and the pinch roller 6. At this time, the conveying roller 5 stands still. Even after the edge 1-A-a of the first sheet 1-A hits the conveying nip, the feed roller 3 is rotated counterclockwise in FIG. 5 by a predetermined amount to align the first sheet 1-A and correct the skew in the state in which the edge 1-A-a of the first sheet 1-A hits the conveying nip.

The multiple double-sided printing is explained with reference to ST15 of FIG. 5. After the end of the skew correction operation on the first sheet 1-A, the conveying motor 205 is driven to start rotating the conveying roller 5 counterclockwise in FIG. 5. The conveying roller 5 conveys the sheet at 15 inches/sec in this embodiment. At this time, the first sheet 1-A has been reversed, the first surface having already undergone the printing operation contacts the platen 8, and the unprinted second surface faces the printhead 7. The first sheet 1-A is aligned with the position where it faces the printhead 7, and the printing operation is performed on the second surface by discharging ink from the printhead 7 based on print data. At this time, the reversing roller 23 stands still. The second sheet 1-B stops and stays in the conveying guide 15 and the reversing conveying guide 21 while being held by the reversing roller 23 and the reversing driven roller 24. The edge 1-B-b of the second sheet 1-B is positioned at POS2 in the conveying guide 15.

Figure 6:
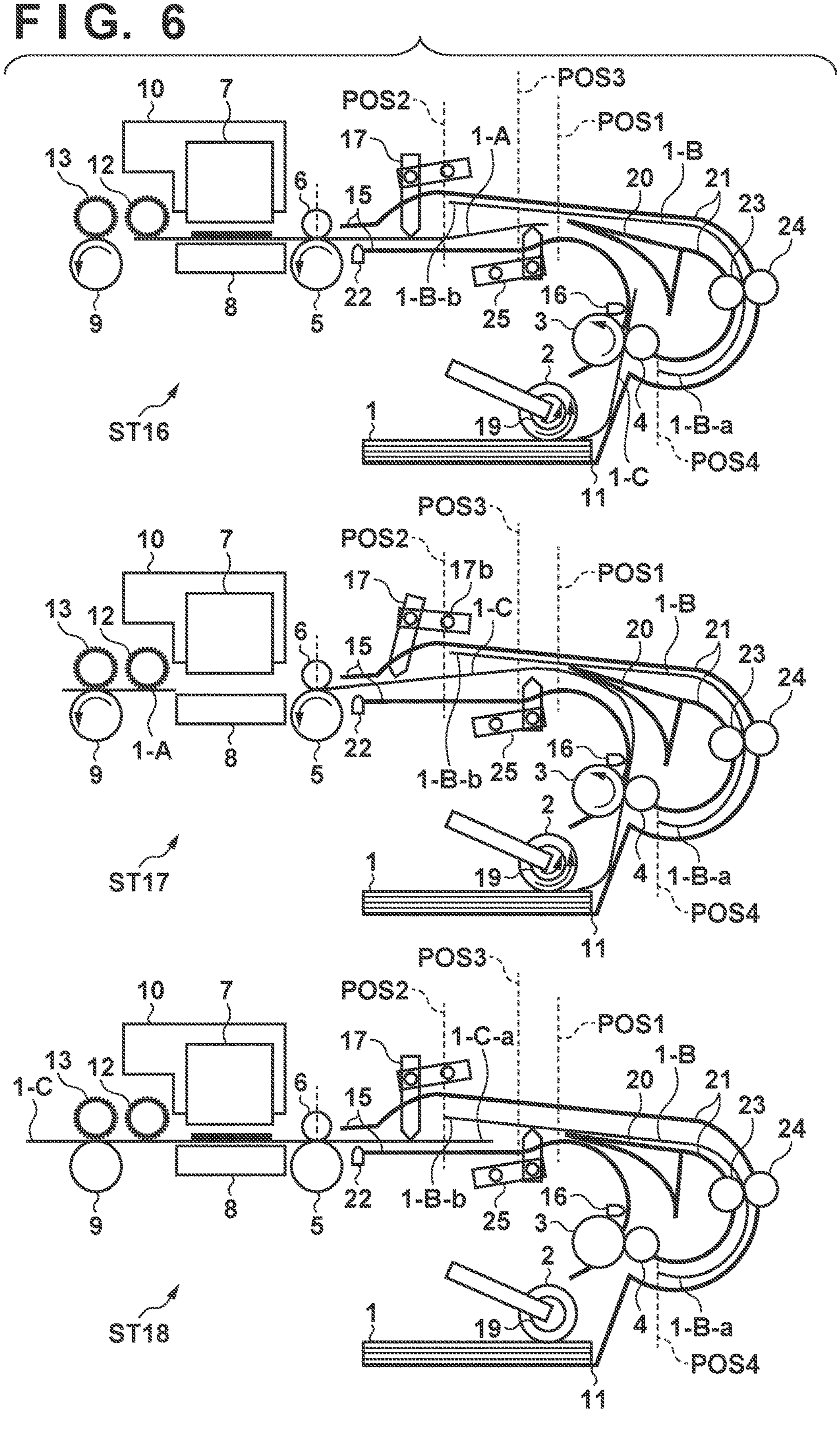
FIG. 6 is a view for explaining the multiple double-sided printing operation by the printing apparatus according to the present invention.

The multiple double-sided printing is explained with reference to ST16 of FIG. 6. A succeeding third sheet 1-C picked up by the pickup roller 2 is conveyed by the feed roller 3 while the position of an edge 1-C-b is managed by leading edge detection of the sheet sensor 16. At this time, the printhead 7 performs the image forming operation on the second surface of the first sheet 1-A based on print data. Along with the image forming operation, the first sheet 1-A is sequentially conveyed downstream in the conveying direction. After the image formation on the first sheet 1-A is completed and unloading from the apparatus is completed, the conveying roller 5 stops.

The multiple double-sided printing is explained with reference to ST17 of FIG. 6. When the image forming operation on the second surface of the first sheet 1-A is completed and the conveying roller 5 stands still, the feed roller 3 is driven to cause the edge 1-C-b of the third sheet 1-C to hit the conveying nip and perform the skew correction operation on the third sheet 1-C. At this time, the reversing roller 23 stands still. The second sheet 1-B stops and stays in the conveying guide 15 and the reversing conveying guide 21 while being held by the reversing roller 23 and the reversing driven roller 24.

The multiple double-sided printing is explained with reference to ST18 of FIG. 6. Along with the intermittent conveyance by the conveying roller 5 in the printing operation on the third sheet 1-C, the first sheet 1-A having undergone the image formation is discharged outside the printing apparatus by the discharge roller 9. After the end of the printing operation on the first surface of the third sheet 1-C, the position of an edge 1-C-a of the third sheet 1-C at the end of printing is determined, and the operation is switched depending on the position of the edge 1-C-a of the third sheet 1-C, similarly to the case at the end of the printing operation on the first surface of the second sheet 1-B. In this description, the edge 1-C-a of the third sheet 1-C is positioned between POS3 and POS2 in the conveying guide 15. Since the edge 1-C-a of the third sheet 1-C is positioned downstream in the conveying direction with respect to POS3 in FIG. 6, the conveying roller 5 is rotated clockwise in FIG. 6 to convey the third sheet 1-C upstream in the conveying direction.

Figure 7:
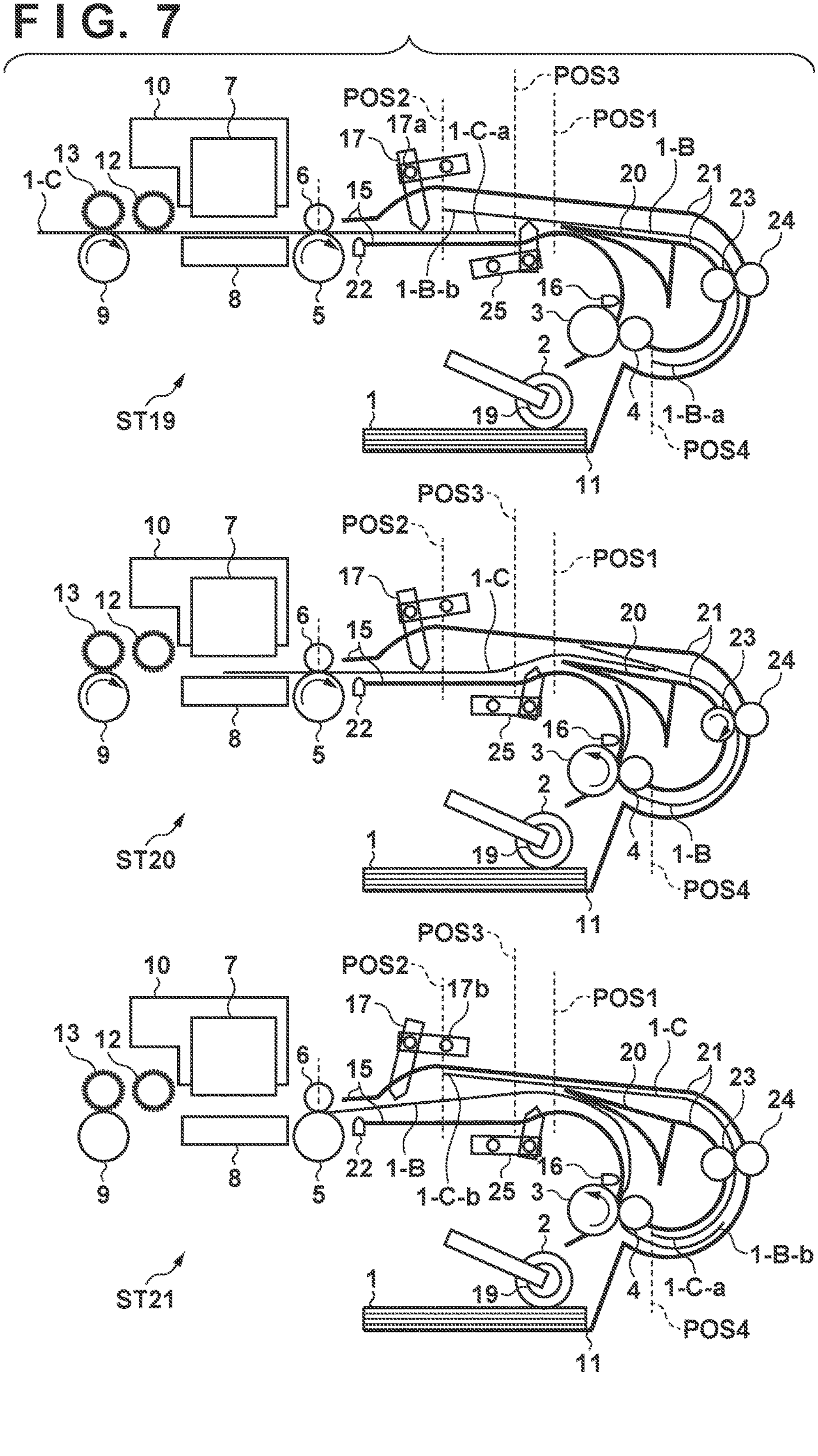
FIG. 7 is a view for explaining the multiple double-sided printing operation by the printing apparatus according to the present invention.

The multiple double-sided printing is explained with reference to ST19 of FIG. 7. The edge 1-C-a of the third sheet 1-C reaches POS3 based on the position information of the edge 1-C-a of the third sheet 1-C. Along with this, the conveying roller 5 and the reversing roller 23 rotate clockwise in FIG. 7 to start conveying the third sheet 1-C and the second sheet 1-B while the edge 1-B-b of the second sheet 1-B and the edge 1-C-a of the third sheet 1-C maintain the overlapping state. Further, the multiple double-sided printing is explained with reference to ST20 of FIG. 7. The edge 1-C-a of the third sheet 1-C is guided to the reversing conveying guide 21 by the second sheet pressing lever 25, and the second sheet 1-B is nipped between the feed roller 3 and the feed driven roller 4 and conveyed to the flapper 20. As the feed roller 3 keeps rotating counterclockwise in FIG. 7, the edge 1-B-a of the second sheet 1-B pushes away the flapper 20 against the weights of the flapper 20, second sheet 1-B, and third sheet 1-C, and joins the conveying guide 15 again.

The multiple double-sided printing is explained with reference to ST21 of FIG. 7. When the edge 1-C-a of the third sheet 1-C reaches POS4 in the reversing conveying guide 21 by rotating the reversing roller 23 clockwise in FIG. 7, the rotation of the conveying roller 5 and reversing roller 23 is stopped. As for the second sheet 1-B, as the feed roller 3 keeps rotating counterclockwise in FIG. 7, the edge 1-B-a of the second sheet 1-B hits the conveying nip formed by the conveying roller 5 and the pinch roller 6. At this time, the conveying roller 5 stands still. Even after the edge 1-B-a of the second sheet 1-B hits the conveying nip, the feed roller 3 is rotated counterclockwise in FIG. 7 by a predetermined amount to align the second sheet 1-B and correct the skew in the state in which the edge 1-B-a of the second sheet 1-B hits the conveying nip.

Figure 8:
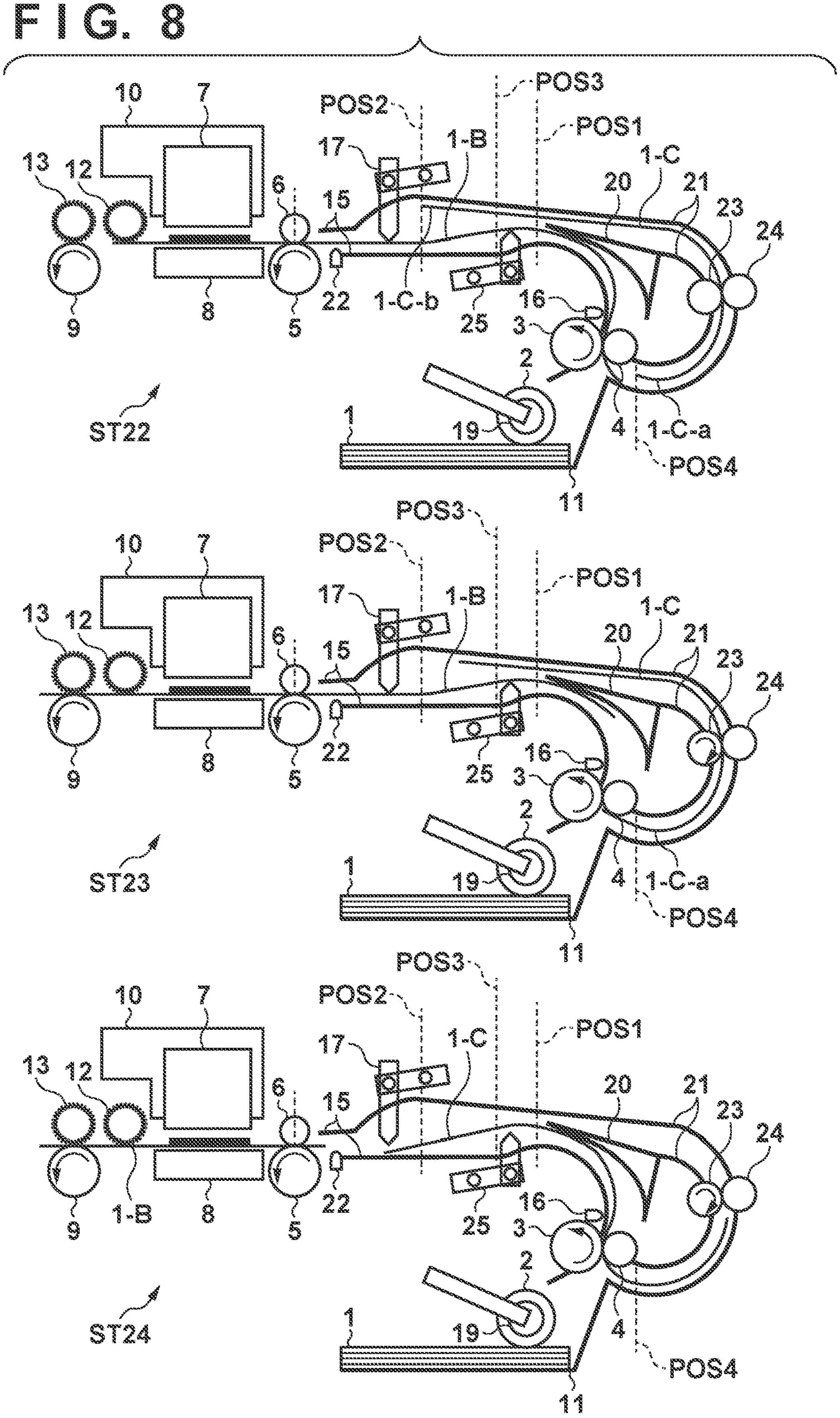
FIG. 8 is a view for explaining the multiple double-sided printing operation by the printing apparatus according to the present invention.

The multiple double-sided printing is explained with reference to ST22 of FIG. 8. After the end of the skew correction operation on the second sheet 1-B, the conveying motor 205 is driven to start rotating the conveying roller 5 counterclockwise in FIG. 8. At this time, the second sheet 1-B has been reversed, the first surface having already undergone the printing operation contacts the platen 8, and the unprinted second surface faces the printhead 7. The second sheet 1-B is aligned with the position where it faces the printhead 7, and the printing operation is performed on the second surface by discharging ink from the printhead 7 based on print data. At this time, the reversing roller 23 stands still. The third sheet 1-C stops and stays in the conveying guide 15 and the reversing conveying guide 21 while being held by the reversing roller 23 and the reversing driven roller 24. The edge 1-C-b of the third sheet 1-C is positioned at POS2 in the conveying guide 15.

The multiple double-sided printing is explained with reference to ST23 of FIG. 8. The reversing roller 23 starts rotating clockwise in FIG. 8 a predetermined time after the sheet sensor 16 detects the edge 1-B-b of the second sheet 1-B. Accordingly, the third sheet 1-C is conveyed to a position of joining the feed roller 3, nipped between the feed roller 3 and the feed driven roller 4, and conveyed to the flapper 20.

The multiple double-sided printing is explained with reference to ST24 of FIG. 8. The edge 1-C-a of the third sheet 1-C is detected by the sheet sensor 16, and the distance between the edge 1-B-b of the second sheet 1-B and the edge 1-C-a of the third sheet 1-C is calculated. Based on the calculated distance, the third sheet 1-C is intermittently conveyed by the feed roller 3 in synchronization with the intermittent conveyance by the conveying roller 5 in the printing operation on the second sheet 1-B so that the distance between the edge 1-B-b of the second sheet 1-B and the edge 1-C-a of the third sheet 1-C takes a predetermined value. At this time, as the feed roller 3 rotates counterclockwise in FIG. 8, the edge 1-C-a of the third sheet 1-C pushes away the flapper 20 against the weights of the flapper 20 and third sheet 1-C, and joins the conveying guide 15 again.

Figure 9:
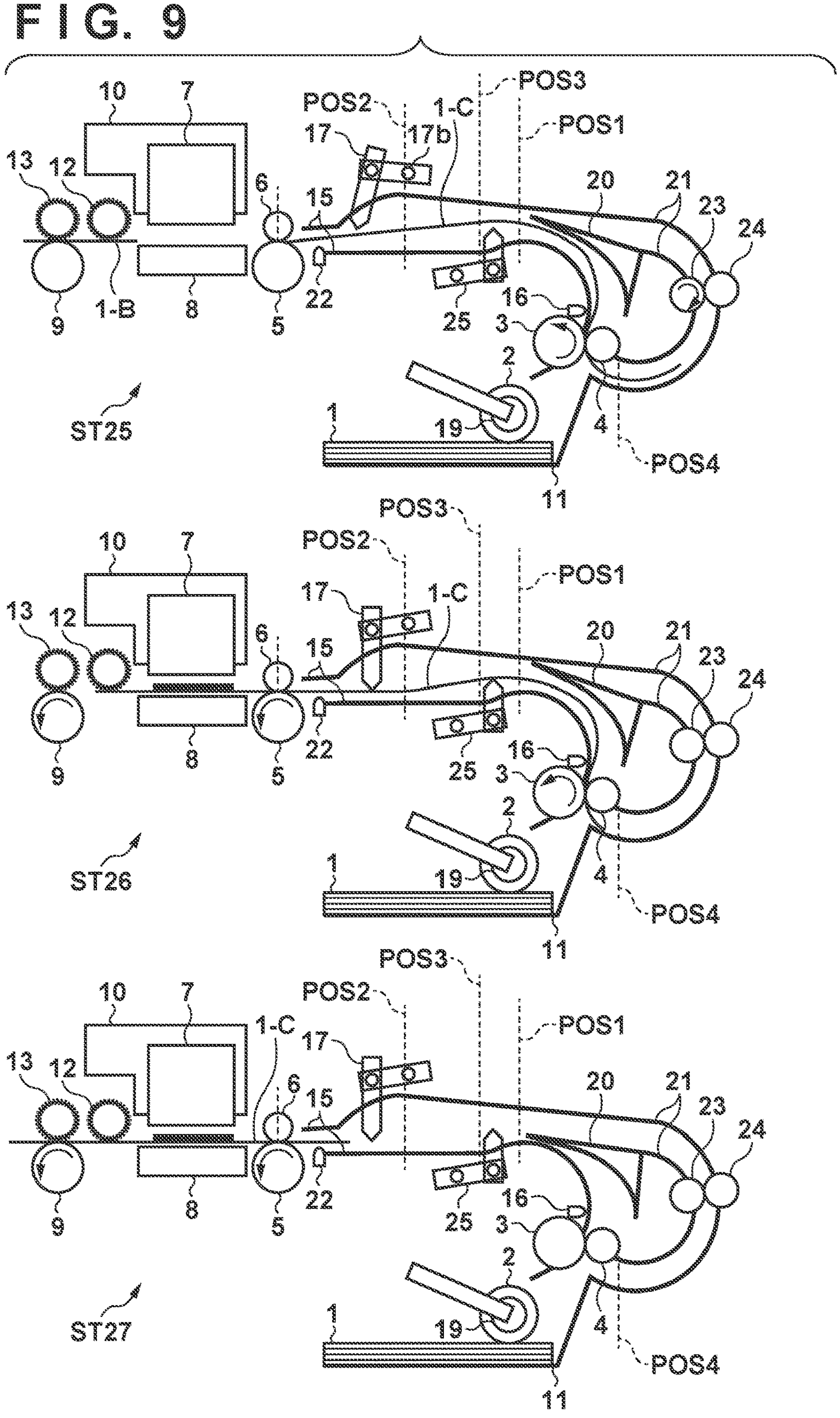
FIG. 9 is a view for explaining the multiple double-sided printing operation by the printing apparatus according to the present invention.

The multiple double-sided printing is explained with reference to ST25 of FIG. 9. When the image forming operation on the second surface of the second sheet 1-B is completed and the conveying roller 5 stands still, the feed roller 3 is driven to cause the edge 1-C-a of the third sheet 1-C to hit the conveying nip and perform the skew correction operation on the third sheet 1-C. The multiple double-sided printing is explained with reference to ST26 of FIG. 9. Along with the intermittent conveyance by the conveying roller 5 in the printing operation on the third sheet 1-C, the second sheet 1-B is discharged outside the printing apparatus by the discharge roller 9. As shown in ST27 of FIG. 9, the printhead 7 performs the printing operation on the second surface of the third sheet 1-C. After the end of the printing operation, the third sheet 1-C is discharged outside the printing apparatus by the discharge roller 9.

(Single Double-Sided Printing)

Figure 10:
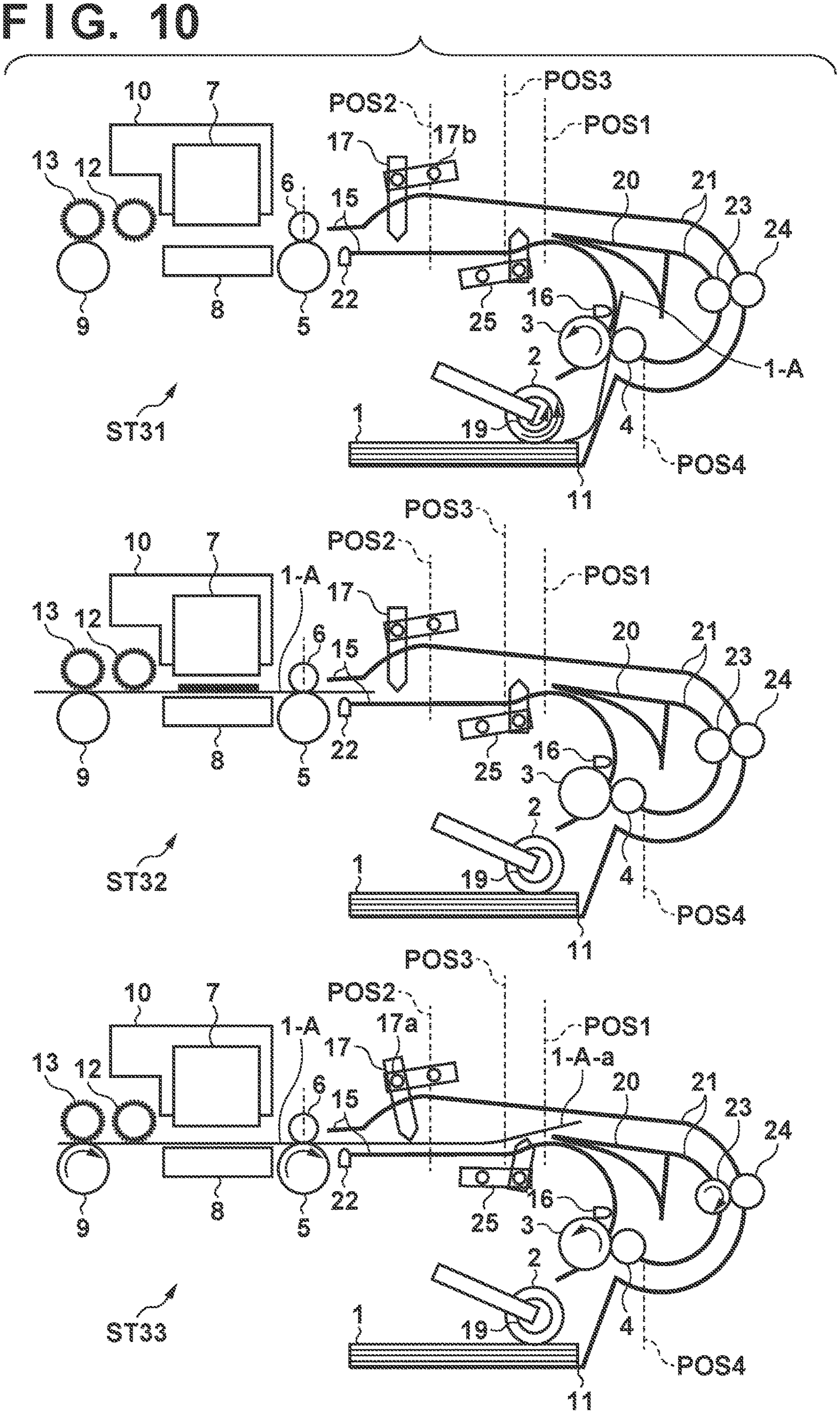
FIG. 10 is a view for explaining a single double-sided printing operation by the printing apparatus according to the present invention.
Figure 12:
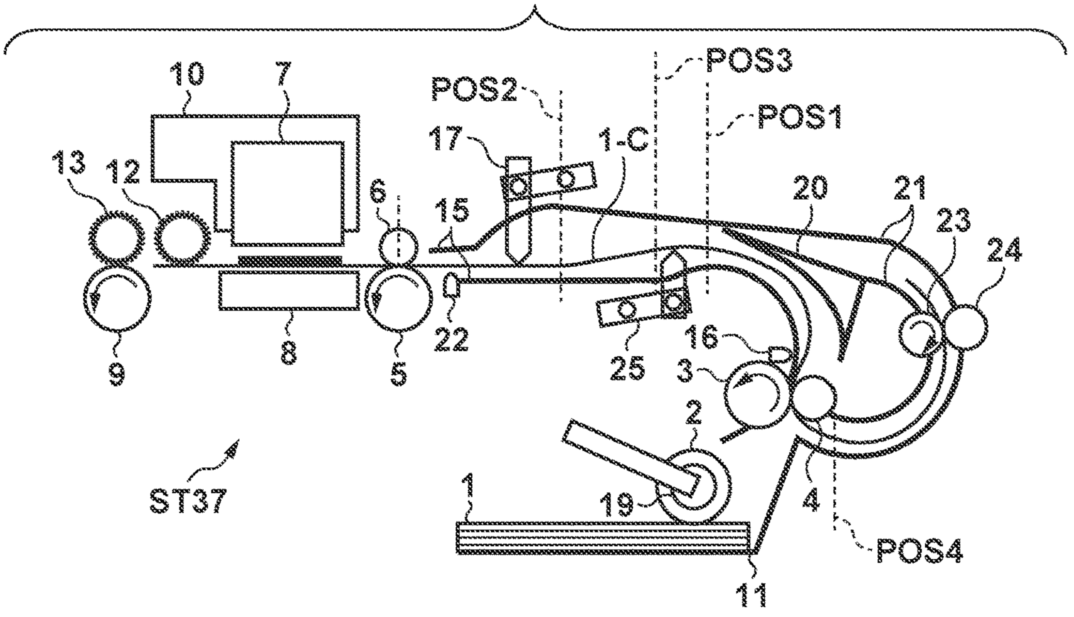
FIG. 12 is a view for explaining the single double-sided printing operation by the printing apparatus according to the present invention.

A double-sided printing operation on a sheet of A3 size serving as a maximum size will be explained in time series with reference to ST31 of FIG. 10 to ST37 of FIG. 12. In this embodiment, a sheet of a sheet size longer than A4 size undergoes not the above-described multiple double-sided printing but single double-sided printing of repeating the printing operation on the first and second surfaces of each sheet. Note that a detailed description of the same operations as those on a print sheet of regularly used A4 size will not be repeated.

Single double-sided printing will be explained with reference to ST31 of FIG. 10. The pickup roller 2 rotates to pick up the top sheet (sheet 1-A) stacked on the feed tray 11, and the sheet 1-A is conveyed by the feed roller 3.

The single double-sided printing will be explained with reference to ST32 of FIG. 10. As the feed roller 3 keeps rotating counterclockwise in FIG. 10, the leading edge of the sheet 1-A hits the conveying nip formed by the conveying roller 5 and the pinch roller 6 to correct the skew and perform the alignment operation. The printing operation is performed on the first surface of the sheet 1-A by discharging ink from the printhead 7 based on print data. After the end of the printing operation on the sheet 1-A, the rotation of the conveying roller 5 and discharge roller 9 stops. At this time, the flapper 20 is moved down owing to its weight, as shown in FIG. 10.

The single double-sided printing is explained with reference to ST33 of FIG. 10. The conveying roller 5 and the discharge roller 9 rotate in a direction (clockwise in FIG. 10) opposite to that in the printing operation, and convey the sheet 1-A toward the conveying guide 15 and the sheet pressing lever 17. As the conveying roller 5 keeps rotating clockwise in FIG. 10, the edge 1-A-a of the sheet 1-A is guided to the reversing conveying guide 21 by the bias of the second sheet pressing lever 25.

Figure 11:
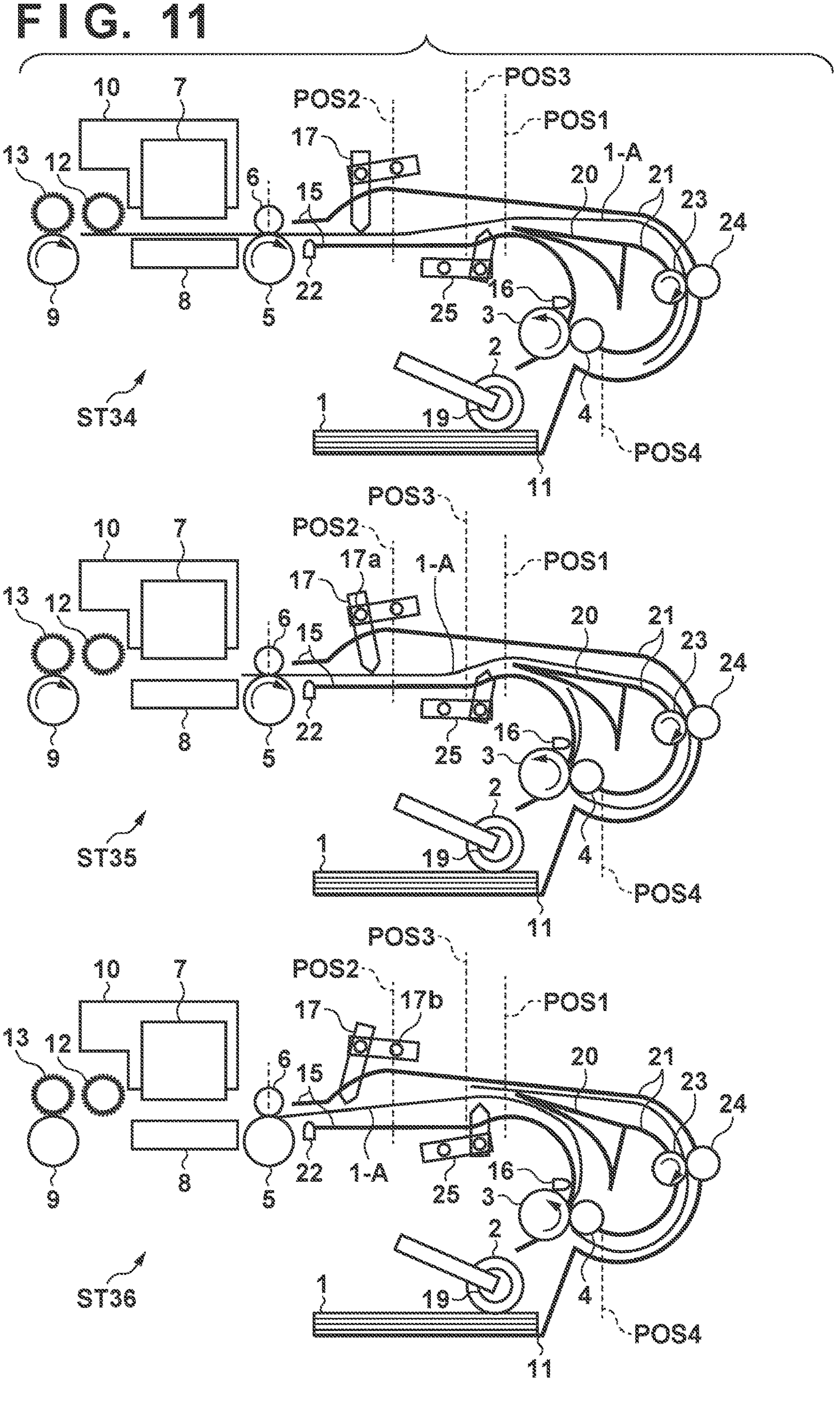
FIG. 11 is a view for explaining the single double-sided printing operation by the printing apparatus according to the present invention.

The single double-sided printing is explained with reference to ST34 of FIG. 11. As the conveying roller 5 keeps rotating clockwise in FIG. 11, the edge 1-A-a (trailing edge at the time of printing on the first surface) of the sheet 1-A is guided to the reversing conveying guide 21 and enters the reversing conveying nip between the reversing roller 23 and the reversing driven roller 24.

The single double-sided printing is explained with reference to ST35 of FIG. 11. As the conveying roller 5 and the reversing roller keep rotating clockwise in FIG. 11, the edge 1-A-a of the sheet 1-A enters the feed nip between the feed roller 3 and the feed driven roller 4. Further, as the feed roller 3 rotates counterclockwise in FIG. 11, the edge 1-A-a of the sheet 1-A pushes away the flapper 20 against the weights of the flapper 20 and sheet 1-A, and joins the conveying guide 15 again.

The single double-sided printing is explained with reference to ST36 of FIG. 11. When the second sheet sensor 22 detects the edge 1-A-b of the sheet 1-A, the conveying roller 5 rotates counterclockwise in FIG. 11 by a predetermined amount and then the rotation of the conveying roller 5 stops temporarily. As the feed roller 3 keeps rotating counterclockwise in FIG. 11, the edge 1-A-a of the sheet 1-A hits the conveying nip formed by the conveying roller 5 and the pinch roller 6 to correct the skew.

The single double-sided printing is explained with reference to ST37 of FIG. 12. After the end of the skew correction operation on the sheet 1-A, the conveying motor 205 is driven to start rotating the conveying roller 5 counterclockwise in FIG. 12. At this time, the sheet 1-A has been reversed, the first surface having already undergone the printing operation contacts the platen 8, and the unprinted second surface faces the printhead 7. The sheet 1-A is aligned with the position where it faces the printhead 7, and the printing operation is performed on the second surface by discharging ink from the printhead 7 based on print data. After the end of the printing operation, the sheet 1-A is discharged outside the printing apparatus by the discharge roller 9.

[Control Sequence]

Figure 15:
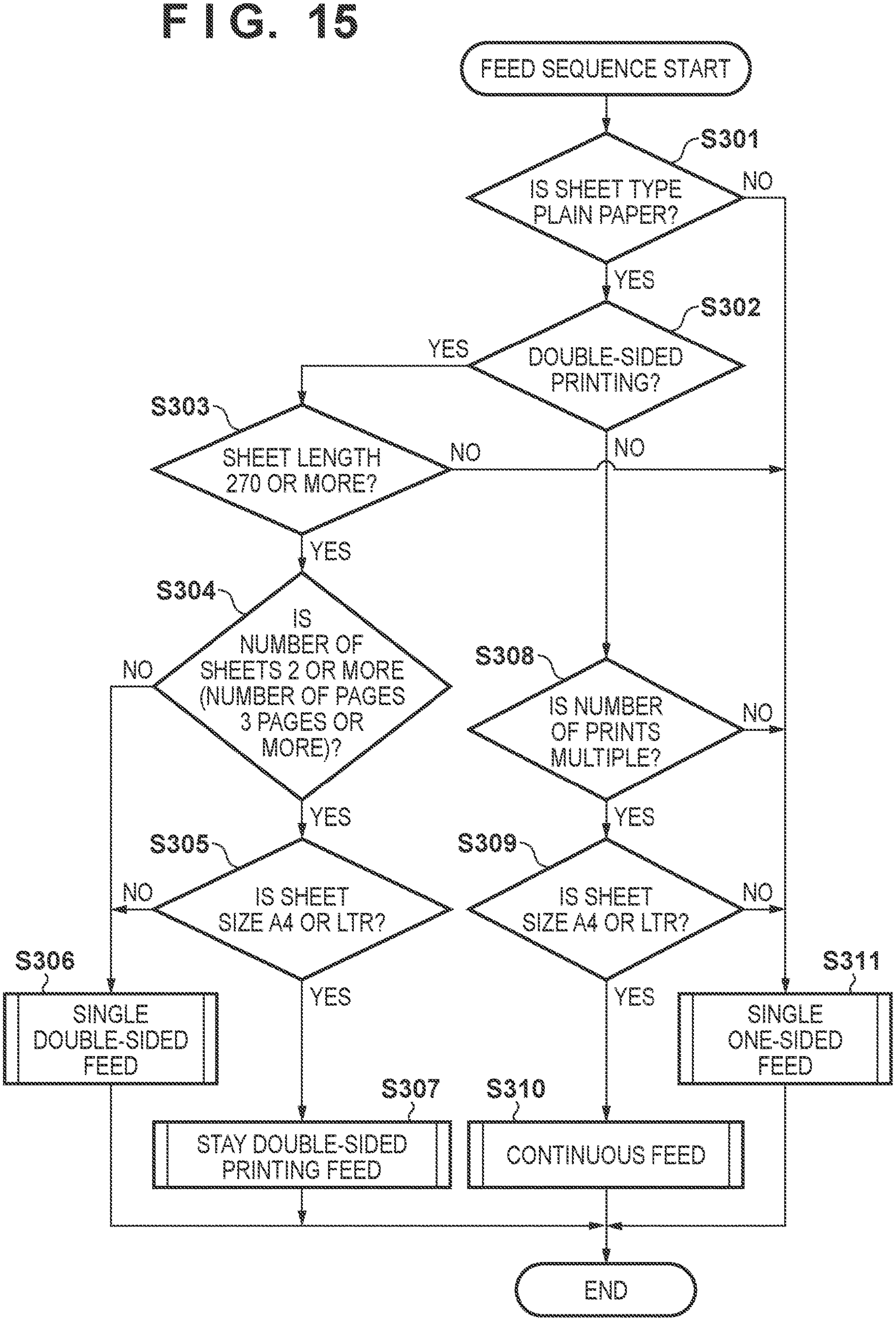
FIG. 15 is a flowchart of a feed operation according to the present invention.

FIG. 15 is a flowchart of a feed operation according to this embodiment. When the host computer 214 transmits sheet information and print data of the sheet 1 via the I/F 213, the printing operation starts. The processing sequence is implemented when the MPU 201 reads out a program stored in the ROM 202 or the like and executes it.

In step S301, the MPU 201 checks the sheet type of sheet 1 and determines whether the sheet used for printing is plain paper. If the sheet used for printing is not plain paper (NO in step S301), the process advances to step S311. If the sheet used for printing is plain paper (YES in step S301), the process advances to step S302.

In step S302, the MPU 201 determines whether double-sided printing is designated in a print request. If double-sided printing is designated (YES in step S302), the process advances to step S303. If double-sided printing is not designated (NO in step S302), the process advances to step S308.

In step S303, the MPU 201 checks the sheet size of the sheet 1 used for printing. In this embodiment, when the sheet length is 270 mm or more, automatic double-sided printing is possible, and the determination is made based on this criterion. The criterion is determined in accordance with the length and shape of the conveying path of the printing apparatus and the like. The sheet length is a length of the sheet 1 in the conveying direction. If the sheet length of the sheet 1 used for printing is 270 mm or more (YES in step S303), the process advances to step S304. If the sheet length is less than 270 mm (NO in step S303), the process advances to step S311.

In step S304, the MPU 201 checks the number of sheets 1 used for printing and determines whether the number of sheets is two or more (multiple). Alternatively, it may be determined whether the number of print pages in double-sided printing is three or more. If the number of sheets is two or more (YES in step S304), the process advances to step S305. If the number of sheets is less than two (that is, one) (NO in step S304), the process advances to step S306.

In step S305, the MPU 201 checks the size of the sheet 1 used for printing and determines whether the sheet size is A4 size (sheet length: 297 mm) or letter size (sheet length: 279.4 mm). The criterion of the sheet size used for this determination is defined in accordance with the type of sheet printable by the printing apparatus. If the sheet size is either size (YES in step S305), the process advances to step S307. If the sheet size is neither size (NO in step S305), the process advances to step S306.

In step S306, the MPU 201 performs a single double-sided feed sequence as the feed sequence. Details of this step will be described with reference to FIGS. 17A and 17B. After the processing in this step, the processing sequence ends.

In step S307, the MPU 201 performs a stay double-sided printing feed sequence as the feed sequence. Details of this step will be described with reference to FIGS. 19A and 19B. After the processing in this step, the processing sequence ends.

In step S308, the MPU 201 checks the number of prints and determines whether the number of prints is multiple. If the number of prints is one (NO in step S308), the process advances to step S311. If the number of prints is multiple, the process advances to step S309.

In step S309, the MPU 201 checks the size of the sheet 1 used for printing and determines whether the sheet size is A4 size (sheet length: 297 mm) or letter size (sheet length: 279.4 mm). If the sheet size is either size (YES in step S309), the process advances to step S310. If the sheet size is neither size (NO in step S309), the process advances to step S311.

In step S310, the MPU 201 performs a continuous feed sequence as the feed sequence. Details of this step will be described with reference to FIGS. 18A and 18B. After the processing in this step, the processing sequence ends.

In step S311, the MPU 201 performs a single one-sided printing sequence as the feed sequence. Details of this step will be described with reference to FIG. 16. After the processing in this step, the processing sequence ends.

(Single One-Sided Printing)

Figure 16:
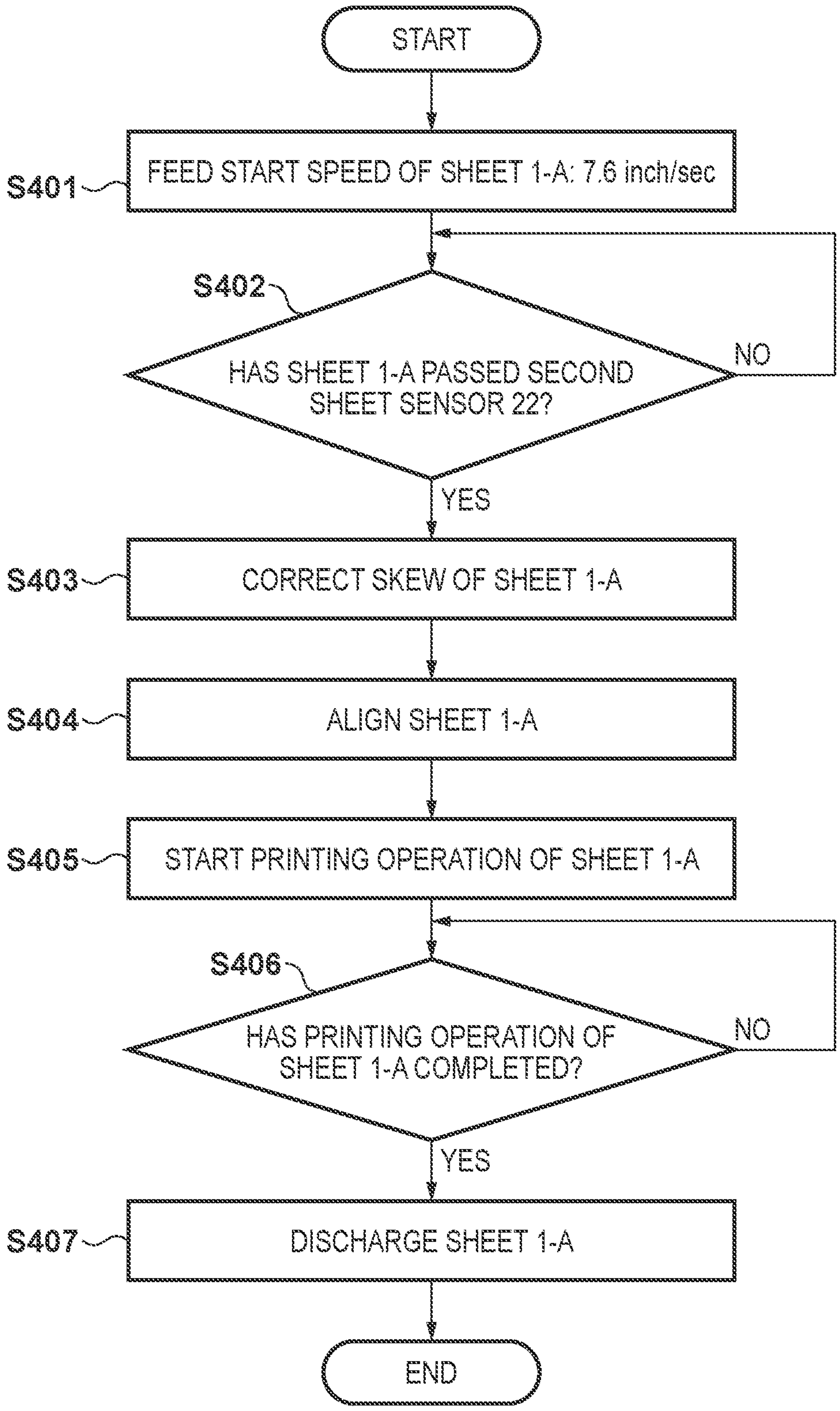
FIG. 16 is a flowchart of single one-sided printing according to the present invention.

FIG. 16 is a flowchart of the single one-sided printing sequence. This operation corresponds to step S311 in FIG. 15.

In step S401, the MPU 201 rotates the pickup roller 2 at 7.6 inches/sec. The sheet 1-A is picked up by the pickup roller 2 and fed by the feed roller 3 toward the printhead 7.

In step S402, the MPU 201 determines whether the second sheet sensor 22 has detected the leading edge of the sheet 1-A. If the second sheet sensor 22 has detected the leading edge of the sheet 1-A (YES in step S402), the process advances to step S403. If the second sheet sensor 22 has not detected the leading edge of the sheet 1-A (NO in step S402), the conveyance continues until the second sheet sensor 22 detects the leading edge of the sheet 1-A.

In step S403, the MPU 201 causes the leading edge of the sheet 1-A to hit the conveying nip, and performs the skew correction operation on the sheet 1-A by controlling the rotation amount of the feed roller 3 after the second sheet sensor 22 detects the leading edge of the sheet 1-A.

In step S404, the MPU 201 aligns the sheet 1-A based on print data.

More specifically, the sheet 1-A is conveyed to a printing start position with respect to the position of the conveying roller 5 based on the print data by controlling the rotation amount of the conveying roller 5.

In step S405, the MPU 201 starts the printing operation by discharging ink from the printhead 7 to the sheet 1-A. More specifically, the printing operation is performed on the sheet 1-A by repeating the conveying operation of intermittently conveying the sheet 1-A by the conveying roller 5, and the image forming operation (ink discharge operation) of moving the carriage 10 and discharging ink from the printhead 7.

In step S406, the MPU 201 determines whether the printing operation on the sheet 1-A is completed. If the printing operation is completed (YES in step S406), the process advances to step S407. If the printing operation is not completed (NO in step S406), the operation continues till the completion of the printing operation.

In step S407, the MPU 201 discharges the sheet 1-A and ends the processing sequence.

(Single Double-Sided Printing)

Figure 17A:
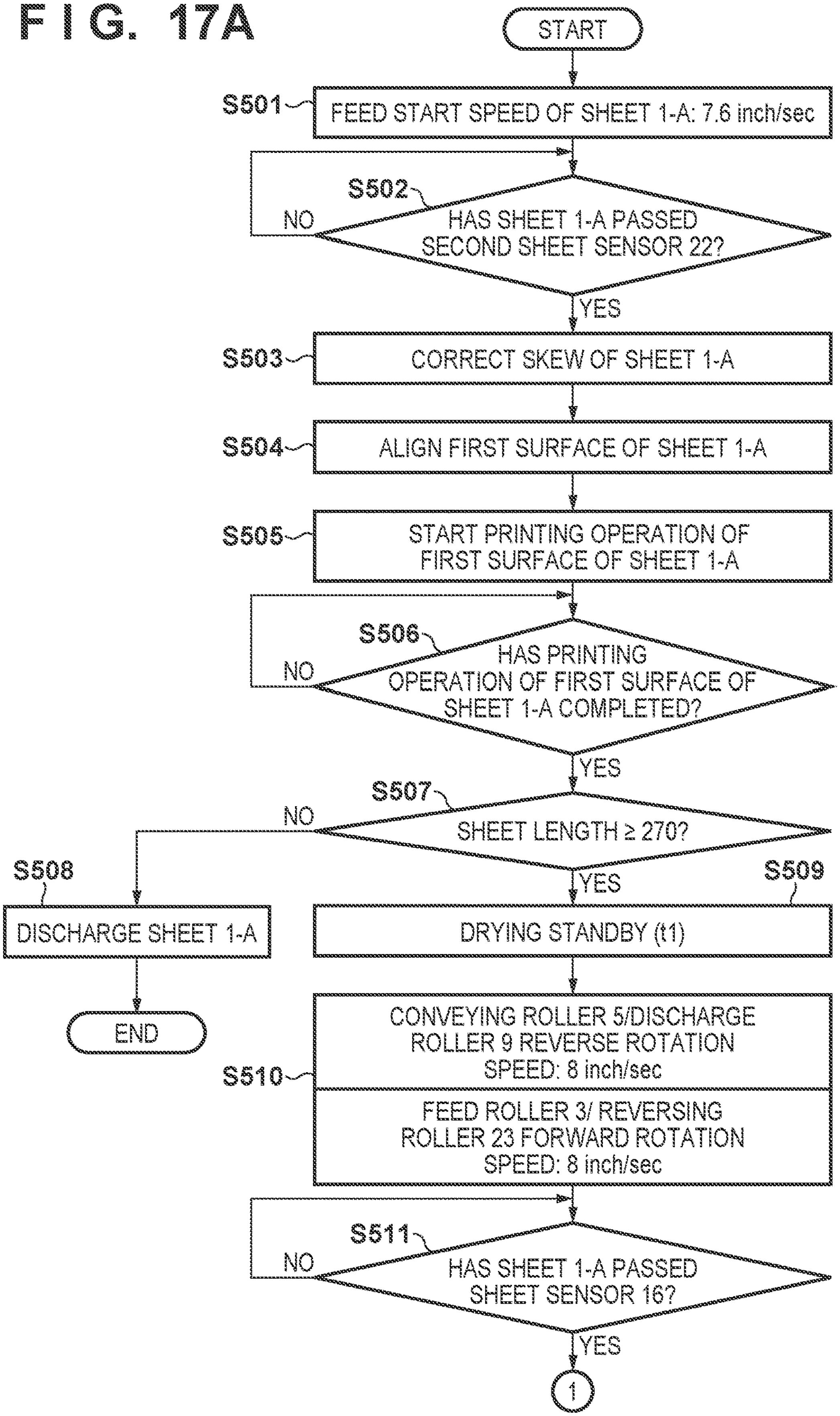
FIGS. 17A and 17B are flowcharts of single double-sided printing according to the present invention.
Figure 17B:
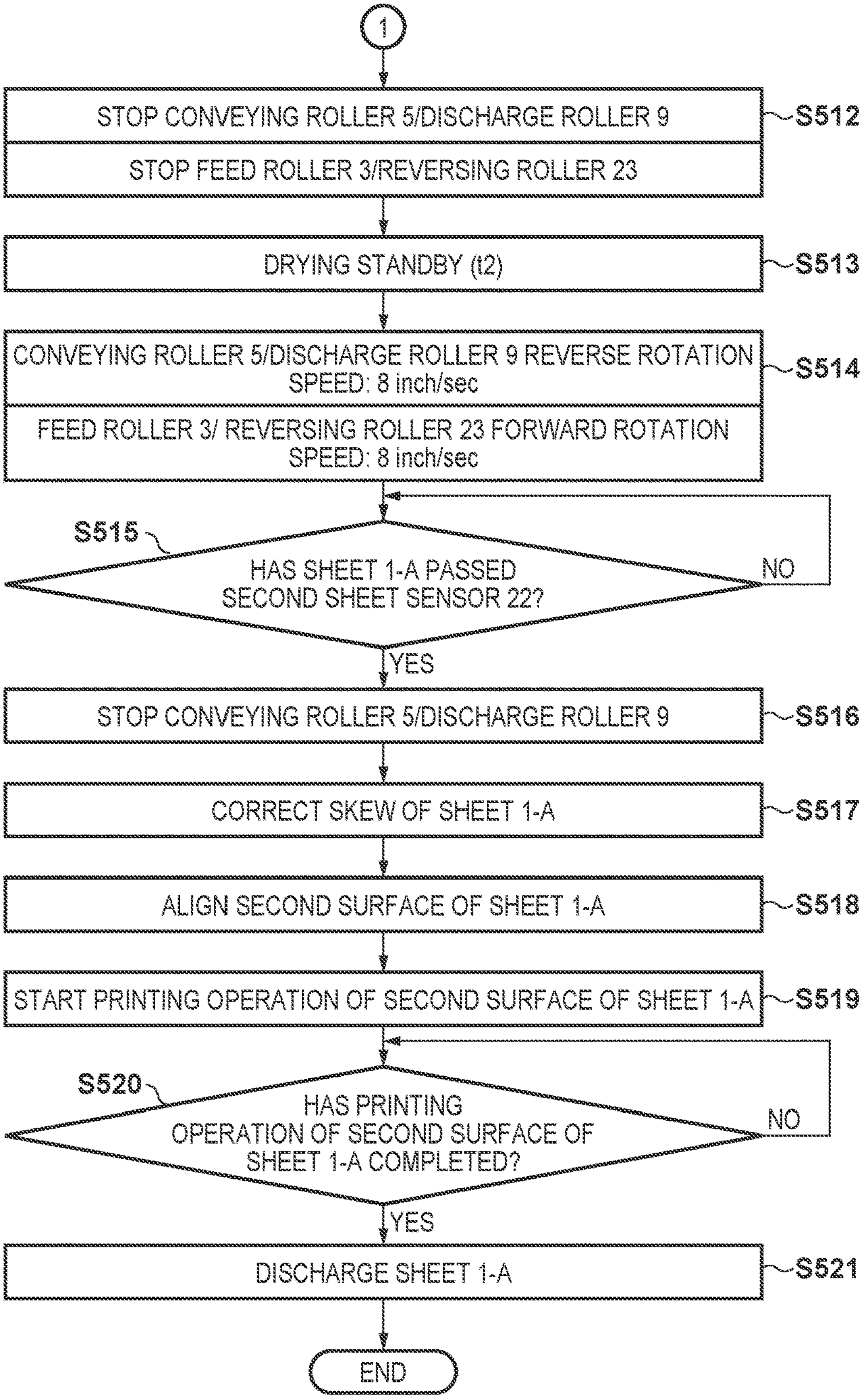

FIGS. 17A and 17B are flowcharts of the single double-sided printing sequence according to this embodiment. This operation corresponds to step S306 in FIG. 15. This operation is pertinent to feed when double-sided printing is performed on a plurality of sheets one by one. In other words, after double-sided printing on one sheet ends, double-sided printing on the next sheet is performed.

In step S501, the MPU 201 rotates the pickup roller 2 at 7.6 inches/sec to print on the first surface. The sheet 1-A is picked up by the pickup roller 2 and fed by the feed roller 3 toward the printhead 7.

In step S502, the MPU 201 determines whether the second sheet sensor 22 has detected the leading edge of the sheet 1-A. If the second sheet sensor 22 has detected the leading edge of the sheet 1-A (YES in step S502), the process advances to step S503. If the second sheet sensor 22 has not detected the leading edge of the sheet 1-A (NO in step S502), the conveyance continues until the second sheet sensor 22 detects the leading edge of the sheet 1-A.

In step S503, the MPU 201 causes the leading edge of the sheet 1-A to hit the conveying nip, and performs the skew correction operation on the sheet 1-A by controlling the rotation amount of the feed roller 3 after the second sheet sensor 22 detects the leading edge of the sheet 1-A.

In step S504, the MPU 201 aligns the first surface of the sheet 1-A based on print data. More specifically, the sheet 1-A is conveyed to the printing start position with respect to the position of the conveying roller 5 based on the print data by controlling the rotation amount of the conveying roller 5.

In step S505, the MPU 201 starts the printing operation by discharging ink from the printhead 7 to the first surface of the sheet 1-A. More specifically, the printing operation is performed on the first surface of the sheet 1-A by repeating the conveying operation of intermittently conveying the sheet 1-A by the conveying roller 5, and the image forming operation (ink discharge operation) of moving the carriage 10 and discharging ink from the printhead 7.

In step S506, the MPU 201 determines whether the printing operation on the first surface of the sheet 1-A is completed. If the printing operation is completed (YES in step S506), the process advances to step S507. If the printing operation is not completed (NO in step S506), the operation continues till the completion of the printing operation.

In step S507, the MPU 201 checks the sheet length of the sheet 1-A and determines whether automatic double-sided printing is possible at this sheet length. In this embodiment, a sheet length of 270 mm or more is a size at which automatic double-sided printing is possible, as described above. The sheet length at this time is calculated from the driving amount of the conveying roller 5 until the second sheet sensor 22 detects the trailing edge of the sheet 1-A after detecting the leading edge of the sheet 1-A. If automatic double-sided printing is possible at this sheet length (YES in step S507), the process advances to step S509. If automatic double-sided printing is impossible at this sheet length (NO in step S507), the process advances to step S508.

In step S508, the MPU 201 discharges the sheet 1-A and ends the processing sequence.

In step S509, the MPU 201 stops the rotation of the conveying roller 5 and discharge roller 9 and stands by until the ink discharged to the first surface of the sheet 1-A is dried. A standby time t1 is determined in consideration of the type of ink, the overlapped ejection amount of ink, the ejection amount of ink per unit area, the environmental temperature, and the like. After the lapse of the standby time t1, the process advances to step S510.

In step S510, the MPU 201 rotates the conveying roller 5 and the discharge roller 9 so as to convey the sheet 1-A to the reversing conveying guide 21 on the upstream side in the conveying direction. At the same time as the start of rotating the conveying roller 5 and the discharge roller 9, the MPU 201 rotates the feed roller 3 and the reversing roller 23 so that the sheet 1-A conveyed through the reversing conveying guide 21 is conveyed downward in the conveying direction. As each roller keeps rotating, the edge 1-A-a of the sheet 1-A enters the feed nip between the feed roller 3 and the feed driven roller 4.

In step S511, the MPU 201 determines whether the sheet sensor 16 has detected the edge 1-A-a of the sheet 1-A. If the sheet sensor 16 has detected the edge 1-A-a of the sheet 1-A (YES in step S511), the process advances to step S512. If the sheet sensor 16 has not detected the edge 1-A-a of the sheet 1-A (NO in step S511), the operation continues until the sheet sensor 16 detects the edge 1-A-a of the sheet 1-A.

In step S512, the MPU 201 stops the rotation of the conveying roller 5, discharge roller 9, feed roller 3, and reversing roller 23.

In step S513, the MPU 201 stands by for a drying standby time t2. Note that this step can be skipped when drying standby for the standby time t1 is executed in step S509. In this case, t2=0 is set and the process may shift to the next step. Drying standby for the drying standby time t2 becomes unnecessary when the trailing edge of the sheet 1-A has a sufficient margin at which no ink is discharged. At this time, the drying time is ensured until ink discharged to the first surface reaches the conveying nip, and no ink is transferred to the pinch roller 6. In contrast, when the sheet 1-A is conveyed from the feed nip while pushing away the flapper 20, a paper jam is highly likely to occur depending on the water retention amount of the sheet 1-A. To prevent this, drying standby for the appropriate drying standby time t2 is executed in this embodiment so that the rigidity of the sheet 1-A is increased by drying and the sheet 1-A can pass through the flapper 20 and the conveying guide 15. After the lapse of the standby time t2, the process advances to step S514.

In step S514, the MPU 201 rotates the conveying roller 5 and the discharge roller 9 at 8 inches/sec and rotates the feed roller 3 and the reversing roller 23 at 8 inches/sec to convey the sheet 1-A so that the sheet 1-A passes through the reversing conveying guide 21 toward the printhead 7.

In step S515, the MPU 201 determines whether the second sheet sensor 22 has detected the edge 1-A-a of the sheet 1-A. If the second sheet sensor 22 has detected the edge 1-A-a of the sheet 1-A (YES in step S515), the process advances to step S516. If the second sheet sensor 22 has not detected the edge 1-A-a of the sheet 1-A (NO in step S515), the conveyance continues until the second sheet sensor 22 detects the edge 1-A-a of the sheet 1-A.

In step S516, the MPU 201 stops the conveying roller 5 and the discharge roller 9 after the second sheet sensor 22 detects the edge of the sheet 1-A.

In step S517, the MPU 201 causes the edge 1-A-a of the sheet 1-A to hit the conveying nip, and performs the skew correction operation on the sheet 1-A by controlling the rotation amount of the feed roller 3.

In step S518, the MPU 201 aligns the second surface of the sheet 1-A based on print data. More specifically, the sheet 1-A is conveyed to the printing start position with respect to the position of the conveying roller 5 based on the print data by controlling the rotation amount of the conveying roller 5.

In step S519, the MPU 201 starts the printing operation by discharging ink from the printhead 7 to the second surface of the sheet 1-A. More specifically, the printing operation is performed on the second surface of the sheet 1-A by repeating the conveying operation of intermittently conveying the sheet 1-A by the conveying roller 5, and the image forming operation (ink discharge operation) of moving the carriage 10 and discharging ink from the printhead 7.

In step S520, the MPU 201 determines whether the printing operation on the second surface of the sheet 1-A is completed. If the printing operation is completed (YES in step S520), the process advances to step S521. If the printing operation is not completed (NO in step S520), the operation continues till the completion of the printing operation.

In step S521, the MPU 201 discharges the sheet 1-A and ends the processing sequence.

(Continuous Feed Operation)

Figure 18A:
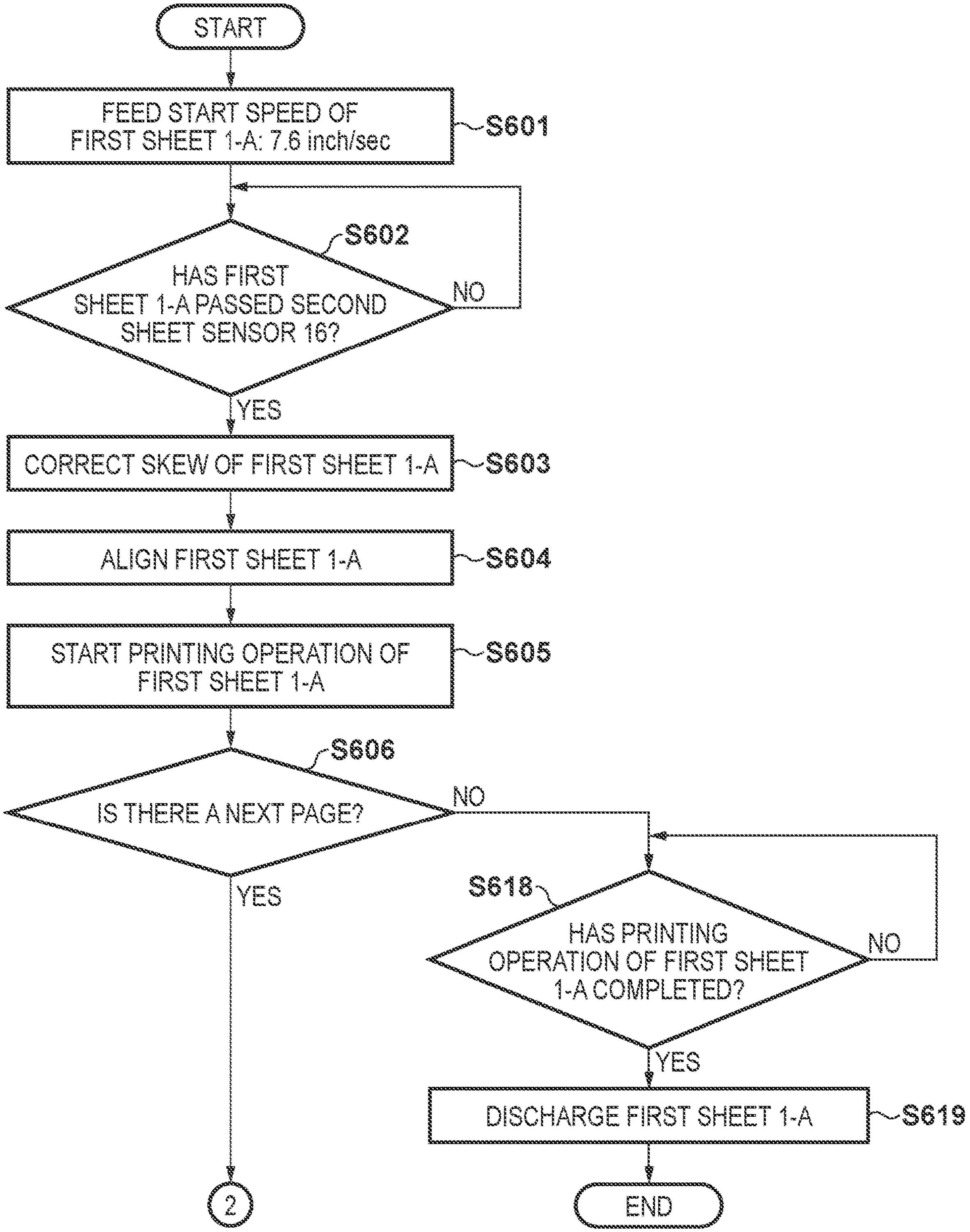
FIGS. 18A and 18B are flowcharts of continuous feed according to the present invention.
Figure 18B:
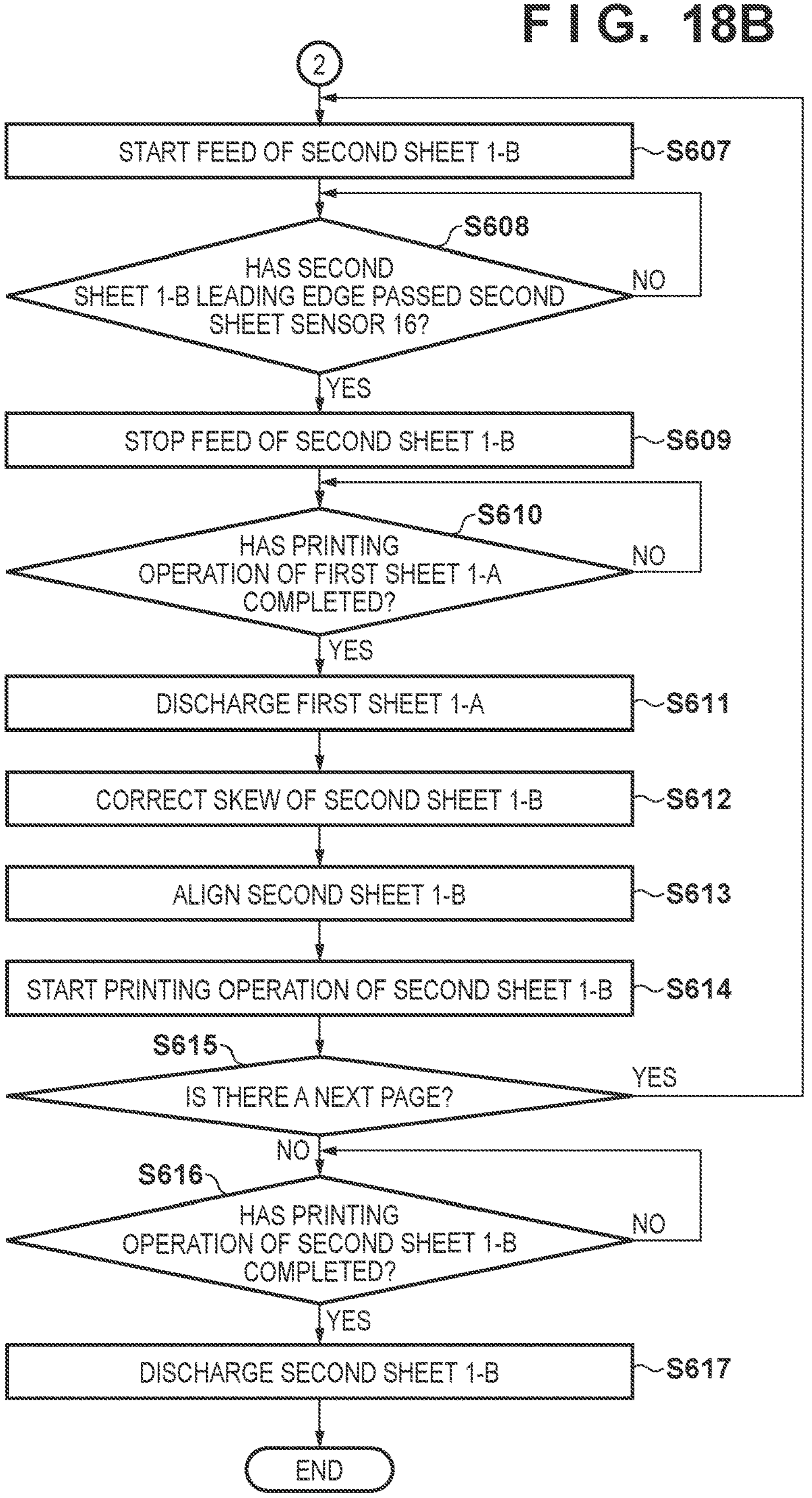

FIGS. 18A and 18B are flowcharts of the continuous feed sequence according to this embodiment. This operation corresponds to step S310 in FIG. 15.

In step S601, the MPU 201 rotates the pickup roller 2 at 7.6 inches/sec. The first sheet 1-A is picked up by the pickup roller 2 and fed by the feed roller 3 toward the printhead 7.

In step S602, the MPU 201 determines whether the sheet sensor 16 has detected the leading edge of the first sheet 1-A. If the sheet sensor 16 has detected the leading edge of the first sheet 1-A (YES in step S602), the process advances to step S603. If the sheet sensor 16 has not detected the leading edge of the first sheet 1-A (NO in step S602), the conveyance continues until the sheet sensor 16 detects the leading edge of the first sheet 1-A.

In step S603, the MPU 201 causes the leading edge of the first sheet 1-A to hit the conveying nip of the conveying roller 5, and performs the skew correction operation on the first sheet 1-A by controlling the rotation amount of the feed roller 3 after the sheet sensor 16 detects the leading edge of the first sheet 1-A.

In step S604, the MPU 201 aligns the first sheet 1-A based on print data. More specifically, the first sheet 1-A is conveyed to the printing start position with respect to the position of the conveying roller 5 based on the print data by controlling the rotation amount of the conveying roller 5.

In step S605, the MPU 201 starts the printing operation by discharging ink from the printhead 7 to the first sheet 1-A. More specifically, the printing operation is performed on the first sheet 1-A by repeating the conveying operation of intermittently conveying the first sheet 1-A by the conveying roller 5, and the image forming operation (ink discharge operation) of moving the carriage 10 and discharging ink from the printhead 7. The MPU 201 intermittently drives the feed motor 206 at a low speed in synchronization with the operation of intermittently conveying the first sheet 1-A by the conveying roller 5. That is, the pickup roller 2 and the feed roller 3 intermittently rotate at 7.6 inches/sec.

In step S606, the MPU 201 determines whether there is print data of the next page. If there is no print data of the next page (NO in step S606), the process advances to step S618. If there is print data of the next page (YES in step S606), the process advances to step S607.

In step S607, the MPU 201 starts the feed operation for the second sheet 1-B. More specifically, the second sheet 1-B is picked up by the pickup roller 2 and fed by the feed roller 3 toward the printhead 7. The pickup roller 2 rotates at 7.6 inches/sec. Since the large recess 2*c* of the pickup roller 2 is provided for the projection 19*a* of the driving shaft 19, as described above, the second sheet 1-B is conveyed at a predetermined interval from the trailing edge of the first sheet 1-A.

In step S608, the MPU 201 determines whether the sheet sensor 16 has detected the leading edge of the second sheet 1-B. If the sheet sensor 16 has detected the leading edge of the second sheet 1-B (YES in step S608), the process advances to step S609. If the sheet sensor 16 has not detected the leading edge of the second sheet 1-B (NO in step S608), the conveyance continues until the sheet sensor 16 detects the leading edge of the second sheet 1-B.

In step S609, the MPU 201 conveys the second sheet 1-B to advance the leading edge of the second sheet 1-B from the conveying nip by a predetermined amount by controlling the rotation amount of the feed roller 3 after the sheet sensor 16 detects the leading edge of the second sheet 1-B. Then, the MPU 201 stops the conveyance. At this time, the first sheet 1-A is intermittently conveyed based on the print data.

In step S610, the MPU 201 determines whether the printing operation on the first sheet 1-A is completed. If the printing operation on the first sheet 1-A is completed (YES in step S610), the process advances to step S611. If the printing operation is not completed (NO in step S610), the operation continues till the completion of the printing operation.

In step S611, the MPU 201 discharges the first sheet 1-A having undergone the printing operation.

In step S612, the MPU 201 causes the leading edge of the second sheet 1-B to hit the conveying nip of the conveying roller 5, and performs the skew correction operation on the second sheet 1-B by controlling the rotation amount of the feed roller 3.

In step S613, the MPU 201 aligns the second sheet 1-B based on print data. More specifically, the second sheet 1-B is conveyed to the printing start position with respect to the position of the conveying roller 5 based on the print data by controlling the rotation amount of the conveying roller 5.

In step S614, the MPU 201 starts the printing operation by discharging ink from the printhead 7 to the second sheet 1-B.

In step S615, the MPU 201 determines whether there is print data of the next page. If there is print data of the next page (YES in step S615), the process returns to step S607 to repeat the operation on the next and subsequent pages. Note that "Nth" is properly substituted in this sequence. If there is no print data of the next page (NO in step S615), the process advances to step S616.

In step S616, the MPU 201 determines whether the printing operation on the second sheet 1-B is completed. If the printing operation on the second sheet 1-B is completed (YES in step S616), the process advances to step S617. If the printing operation is not completed (NO in step S616), the operation continues till the completion of the printing operation.

In step S617, the MPU 201 discharges the second sheet 1-B and ends the processing sequence.

In step S618, the MPU 201 determines whether the printing operation on the first sheet 1-A is completed. If the printing operation on the first sheet 1-A is completed (YES in step S618), the process advances to step S619. If the printing operation is not completed (NO in step S618), the operation continues till the completion of the printing operation.

In step S619, the MPU 201 discharges the first sheet 1-A and ends the processing sequence.

(Multiple Double-Sided Printing Operation)

Figure 19A:
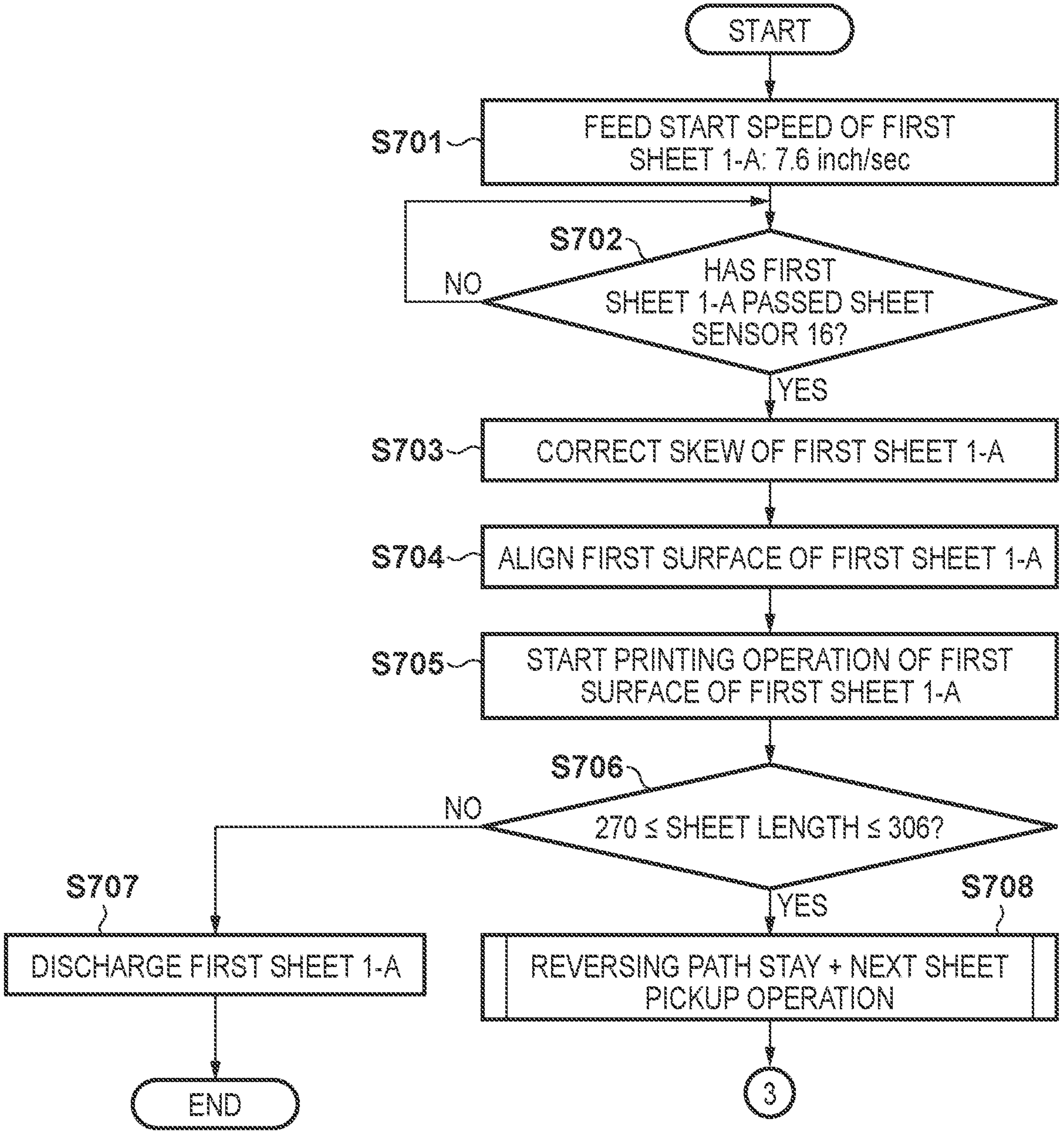
FIGS. 19A and 19B are flowcharts of multiple double-sided printing according to the present invention.
Figure 19B:
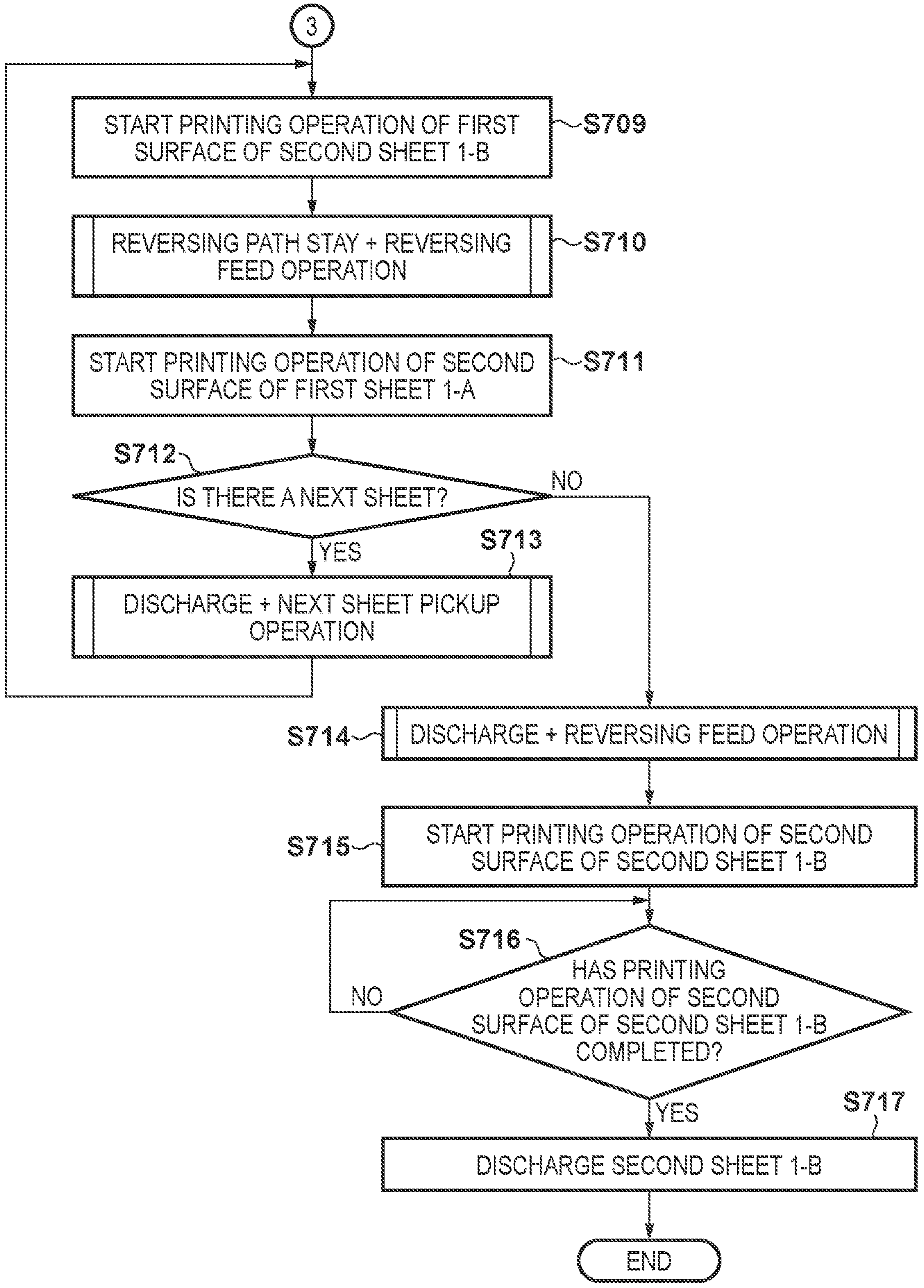

FIGS. 19A and 19B are flowcharts of the multiple double-sided printing feed sequence according to this embodiment. This operation corresponds to step S307 in FIG. 15.

In step S701, the MPU 201 rotates the pickup roller 2 at 7.6 inches/sec. The first sheet 1-A is picked up by the pickup roller 2 and fed by the feed roller 3 toward the printhead 7.

In step S702, the MPU 201 determines whether the sheet sensor 16 has detected the leading edge of the first sheet 1-A. If the sheet sensor 16 has detected the leading edge of the first sheet 1-A (YES in step S702), the process advances to step S703. If the sheet sensor 16 has not detected the leading edge of the first sheet 1-A (NO in step S702), the conveyance continues until the sheet sensor 16 detects the leading edge.

In step S703, the MPU 201 causes the leading edge of the first sheet 1-A to hit the conveying nip of the conveying roller 5, and performs the skew correction operation on the first sheet 1-A by controlling the rotation amount of the feed roller 3 after the sheet sensor 16 detects the leading edge of the first sheet 1-A.

In step S704, the MPU 201 aligns the first sheet 1-A based on print data. More specifically, the first sheet 1-A is conveyed to the printing start position with respect to the position of the conveying roller 5 based on the print data by controlling the rotation amount of the conveying roller 5.

In step S705, the MPU 201 starts the printing operation by discharging ink from the printhead 7 to the first surface of the first sheet 1-A.

In step S706, the MPU 201 checks the sheet length of the first sheet 1-A and determines whether the sheet length falls within a range of 270 to 306 mm (A4 size or letter size). As described above, the criterion of determining the sheet length changes depending on the arrangement of the printing apparatus. If the sheet length falls within this range (YES in step S706), the process advances to step S708. If the sheet length falls outside this range (NO in step S706), the process advances to step S707.

In step S707, the MPU 201 discharges the first sheet 1-A and ends the processing sequence.

In step S708, the MPU 201 performs a reversing path stay+next sheet pickup operation. In this step, the first sheet 1-A stays in the conveying guide 15 and the reversing conveying guide 21, and the second sheet 1-B is picked up. Details of the reversing path stay+next sheet pickup operation will be described with reference to FIGS. 20A and 20B. After this step, the process advances to step S709.

In step S709, the MPU 201 starts the printing operation on the first surface of the second sheet 1-B.

In step S710, the MPU 201 performs a reversing path stay+reversing feed operation (overlapping reversing operation). In this step, the second sheet 1-B stays in the conveying guide 15 and the reversing conveying guide 21. At the same time, the first sheet 1-A staying in the conveying guide 15 and the reversing conveying guide 21 is reversed and fed. Details of the reversing path stay+reversing feed operation will be described with reference to FIGS. 21A and 21B. After this step, the process advances to step S711.

In step S711, the MPU 201 starts the printing operation on the second surface of the first sheet 1-A.

In step S712, the MPU 201 determines whether to perform the printing operation on the third sheet 1-C serving as a sheet next to the second sheet 1-B. If the printing operation is to be performed on the third sheet 1-C(YES in step S712), the process advances to step S713. If the printing operation is to end up to the second sheet (NO in step S712), the process advances to step S714.

In step S713, the MPU 201 performs a discharge+next sheet pickup operation. In this step, the third sheet 1-C is picked up while the first sheet 1-A is discharged. Details of the discharge+next sheet pickup operation will be described with reference to FIG. 22. After this step, the process returns to step S709 to repeat the operation on the next and subsequent pages. Note that “Nth” is properly substituted in this sequence.

In step S714, the MPU 201 performs a discharge+reversing feed operation. In this step, the second sheet 1-B staying in the conveying guide 15 and the reversing conveying guide 21 is reversed and fed while the first sheet 1-A is discharged. Details of the discharge+reversing feed operation will be described with reference to FIG. 23. After this step, the process advances to step S715.

In step S715, the MPU 201 performs the printing operation on the second surface of the second sheet 1-B.

In step S716, the MPU 201 determines whether the printing operation on the second surface of the second sheet 1-B is completed. If the printing operation on the second surface of the second sheet 1-B is completed (YES in step S716), the process advances to step S717. If the printing operation is not completed (NO in step S716), the operation continues till the completion of the printing operation.

In step S717, the MPU 201 discharges the second sheet 1-B. Then, the processing sequence ends.

(Reversing Path Stay+Next Sheet Pickup Operation)

Figure 20A:
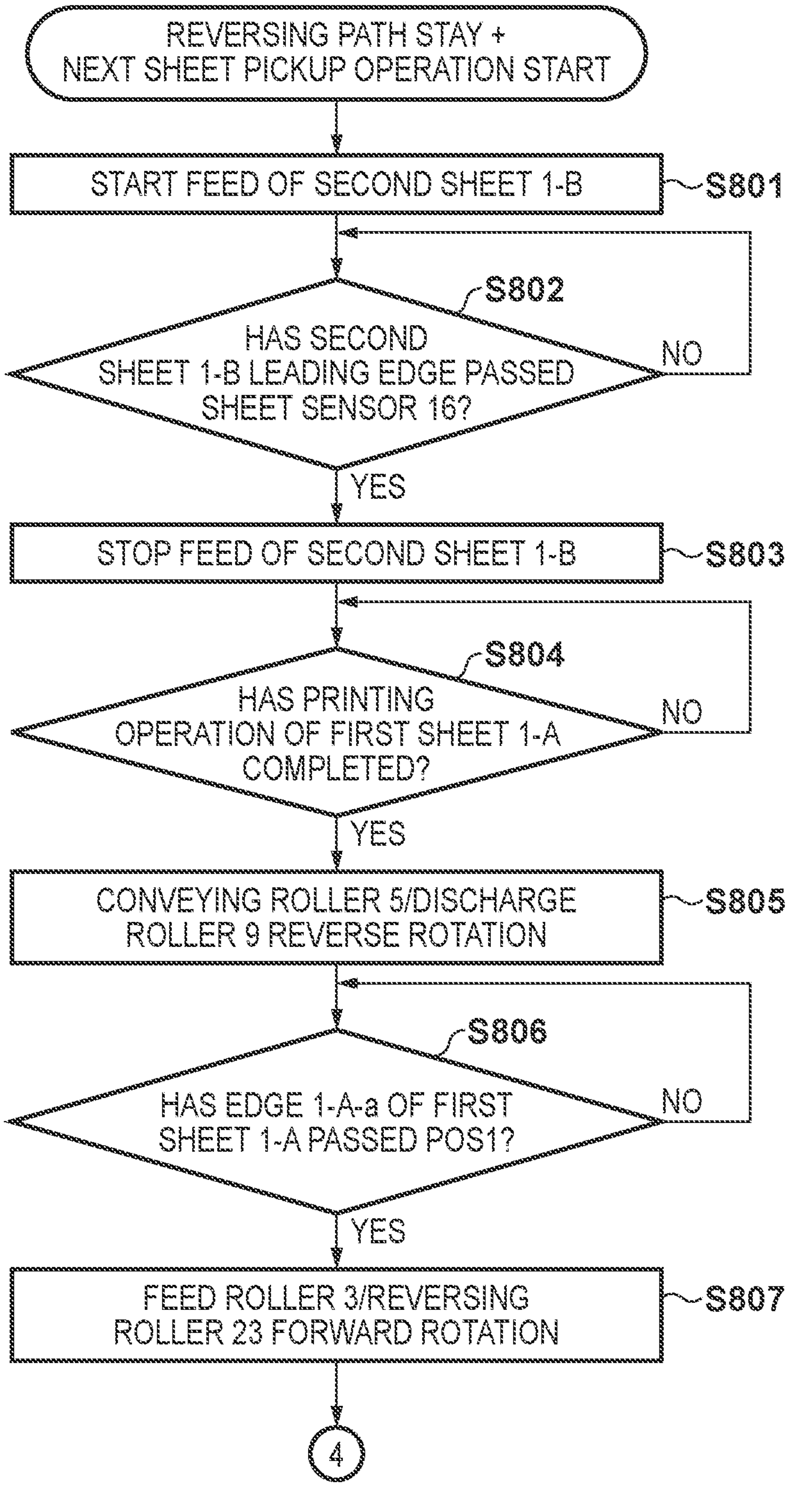
FIGS. 20A and 20B are flowcharts of reversing path stay+next sheet pickup according to the present invention.
Figure 20B:
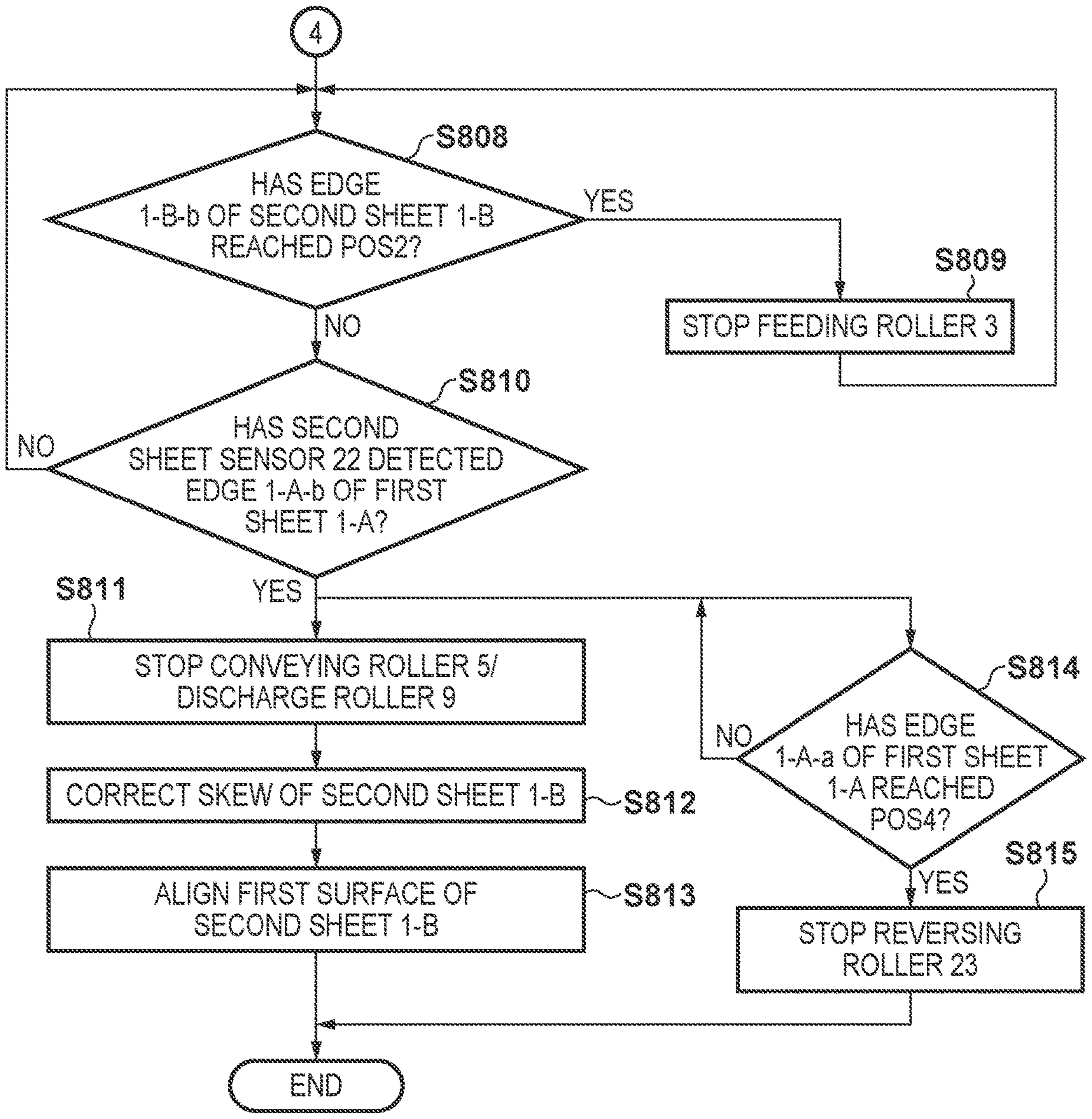

FIGS. 20A and 20B are flowcharts of the reversing path stay+next sheet pickup operation. This operation corresponds to step S708 in FIG. 19A.

In step S801, the MPU 201 controls the pickup roller 2 to pick up the second sheet 1-B during the printing operation on the first sheet 1-A, and the feed roller 3 to feed the second sheet 1-B toward the printhead 7.

In step S802, the MPU 201 determines whether the sheet sensor 16 has detected the leading edge of the second sheet 1-B. If the sheet sensor 16 has detected the leading edge of the second sheet 1-B (YES in step S802), the process advances to step S803. If the sheet sensor 16 has not detected the leading edge of the second sheet 1-B (NO in step S802), the conveying operation continues until the sheet sensor 16 detects the leading edge of the second sheet 1-B.

In step S803, the MPU 201 stops the feed roller 3 to temporarily stop the feed of the second sheet 1-B.

In step S804, the MPU 201 determines whether the printing operation on the first surface of the first sheet 1-A is completed. If the printing operation on the first surface of the first sheet 1-A is completed (YES in step S804), the process advances to step S805. If the printing operation is not completed (NO in step S804), the operation continues till the completion of the printing operation.

In step S805, the MPU 201 rotates the conveying roller 5 and the discharge roller 9 so as to convey the first sheet 1-A to the upstream (reversing conveying guide 21) side in the conveying direction.

In step S806, the MPU 201 determines whether the edge 1-A-a of the first sheet 1-A has passed through POS1 serving as the introduction of the flapper 20 and reversing conveying guide 21 by the rotation of each roller. If the edge 1-A-a of the first sheet 1-A has passed (YES in step S806), the process advances to step S807. If the edge 1-A-a of the first sheet 1-A has not passed (NO in step S806), the conveyance of the first sheet 1-A continues.

In step S807, the MPU 201 rotates the feed roller 3 and the reversing roller 23 so as to convey the second sheet 1-B downstream in the conveying direction.

In step S808, the MPU 201 determines whether the edge 1-B-b of the second sheet 1-B has reached POS2. If the edge 1-B-b of the second sheet 1-B has reached POS2 (YES in step S808), the process advances to step S809. If the edge 1-B-b of the second sheet 1-B has not reached POS2 (NO in step S808), the process advances to step S810.

In step S809, the MPU 201 stops the feed roller 3 and suspends entrance of the second sheet 1-B into the conveying nip. After that, the process returns to step S808.

In step S810, the MPU 201 determines whether the second sheet sensor 22 has detected the edge 1-A-b of the first sheet. If the second sheet sensor 22 has detected the edge 1-A-b of the first sheet (YES in step S810), the process advances to step S811. If the second sheet sensor 22 has not detected the edge 1-A-b of the first sheet (NO in step S810), the process returns to step S808.

In step S811, the MPU 201 stops the conveying roller 5 and the discharge roller 9. Along with this, the second sheet 1-B enters the conveying nip of the conveying roller 5.

In step S812, the MPU 201 corrects the skew of the second sheet 1-B.

In step S813, the MPU 201 aligns the second sheet 1-B. Then, the processing sequence ends.

The MPU 201 performs steps S814 and S815 for the first sheet 1-A conveyed to the reversing conveying guide 21 in parallel with steps S811 to S813.

In step S814, the MPU 201 determines whether the edge 1-A-a of the first sheet 1-A has reached POS4 in the reversing conveying guide 21. If the edge 1-A-a of the first sheet 1-A has reached POS4 (YES in step S814), the process advances to step S815. If the edge 1-A-a of the first sheet 1-A has not reached POS4 (NO in step S814), the conveyance of the first sheet 1-A continues.

In step S815, the MPU 201 stops the reversing roller 23 and makes the first sheet 1-A stay. Then, the processing sequence ends.

(Reversing Path Stay+Reversing Feed Operation)

Figure 21A:
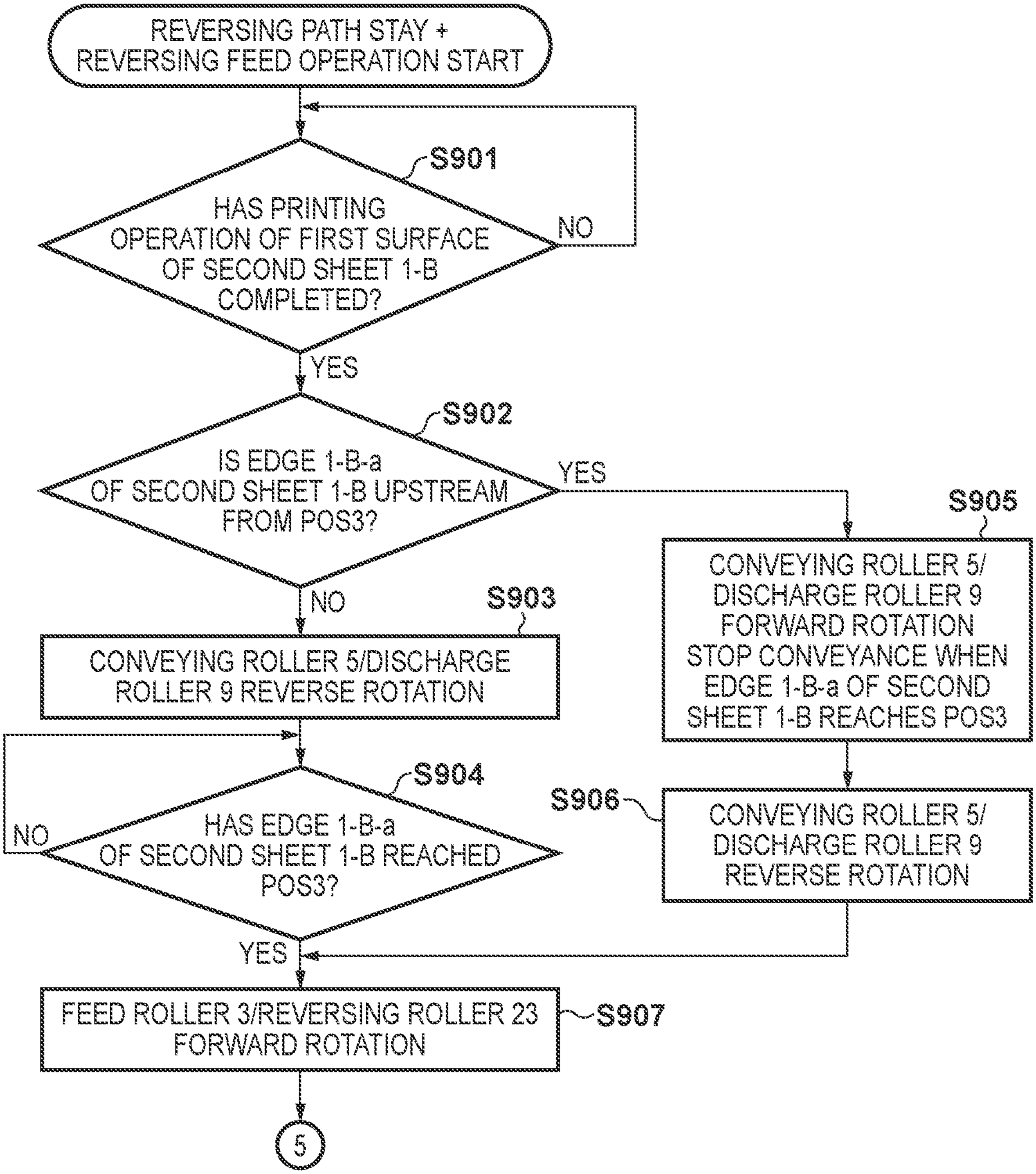
FIGS. 21A and 21B are flowcharts of reversing path stay+reversing feed according to the present invention.
Figure 21B:
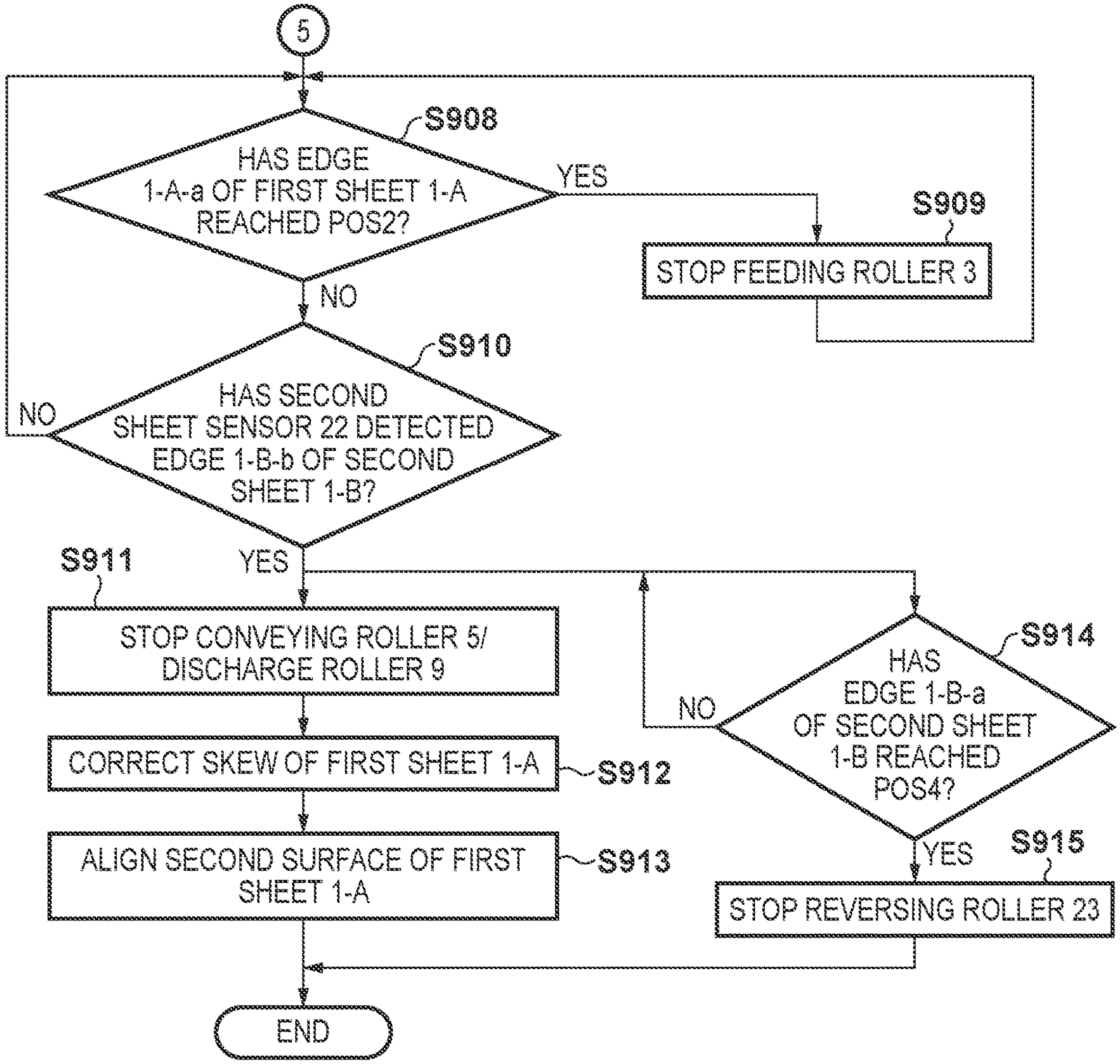

FIGS. 21A and 21B are flowcharts of the reversing path stay+reversing feed operation (overlapping reversing operation). This operation corresponds to step S710 of FIG. 19B.

In step S901, the MPU 201 determines whether the printing operation on the first surface of the second sheet 1-B is completed. If the printing operation on the first surface of the second sheet 1-B is completed (YES in step S901), the process advances to step S902. If the printing operation on the first surface of the second sheet 1-B is not completed (NO in step S901), the printing operation on the second sheet 1-B continues.

In step S902, the MPU 201 checks the position of the edge 1-B-a of the second sheet 1-B, and determines whether the edge 1-B-a of the second sheet 1-B is positioned on the upstream side of POS3 in the conveying direction. If the edge 1-B-a of the second sheet 1-B is positioned on the upstream side of POS3 (YES in step S902), the process advances to step S905. If the edge 1-B-a of the second sheet 1-B is not positioned on the upstream side of POS3 (NO in step S902), the process advances to step S903. The case in which the edge 1-B-a of the second sheet 1-B is not positioned on the upstream side of POS3 is a state in which the second sheet 1-B and the first sheet 1-A overlap each other at least partially between POS2 and POS3, as shown in ST11 of FIG. 4.

In step S903, the MPU 201 rotates the conveying roller 5 and the discharge roller 9 so as to convey the second sheet 1-B upstream in the conveying direction.

In step S904, the MPU 201 determines whether the edge 1-B-a of the second sheet 1-B has reached POS3. If the edge 1-B-a of the second sheet 1-B has reached POS3 (YES in step S904), the process advances to step S907. If the edge 1-B-a of the second sheet 1-B has not reached POS3 (NO in step S904), the conveyance of the second sheet 1-B continues.

In step S905, the MPU 201 rotates the conveying roller 5 and the discharge roller 9 so as to convey the second sheet 1-B downstream in the conveying direction, and stops them when the edge 1-B-a of the second sheet 1-B reaches POS3.

In step S906, the MPU 201 rotates the conveying roller 5 and the discharge roller 9 so as to convey the second sheet 1-B upstream (reversing conveying guide 21) in the conveying direction.

In step S907, the MPU 201 rotates the feed roller 3 and the reversing roller 23 so as to convey the first sheet 1-A downstream in the conveying direction through the reversing conveying guide 21, and starts feeding the first sheet 1-A.

In step S908, the MPU 201 determines whether the edge 1-A-a of the first sheet 1-A has reached POS2. If the edge 1-A-a of the first sheet 1-A has reached POS2 (YES in step S908), the process advances to step S909. If the edge 1-A-a of the first sheet 1-A has not reached POS2 (NO in step S908), the process advances to step S910.

In step S909, the MPU 201 stops the feed roller 3 and suspends entrance of the first sheet 1-A into the conveying nip of the conveying roller 5. After that, the process returns to step S908.

In step S910, the MPU 201 determines whether the second sheet sensor 22 has detected the edge 1-B-b of the second sheet. If the second sheet sensor 22 has detected the edge 1-B-b of the second sheet (YES in step S910), the process advances to step S911. If the second sheet sensor 22 has not detected the edge 1-B-b of the second sheet (NO in step S910), the process returns to step S908.

In step S911, the MPU 201 stops the conveying roller 5 and the discharge roller 9. Along with this, the first sheet 1-A enters the conveying nip of the conveying roller 5.

In step S912, the MPU 201 corrects the skew of the first sheet 1-A.

In step S913, the MPU 201 aligns the first sheet 1-A. Then, the processing sequence ends.

The MPU 201 performs steps S914 and S915 for the second sheet 1-B conveyed to the reversing conveying guide 21 in parallel with steps S911 to S913.

In step S914, the MPU 201 determines whether the edge 1-B-a of the second sheet 1-B has reached POS4 in the reversing conveying guide 21. If the edge 1-B-a of the second sheet 1-B has reached POS4 (YES in step S914), the process advances to step S915. If the edge 1-B-a of the second sheet 1-B has not reached POS4 (NO in step S914), the conveyance of the second sheet 1-B continues.

In step S915, the MPU 201 stops the reversing roller 23 and makes the second sheet 1-B stay. Then, the processing sequence ends.

(Discharge+Next Sheet Pickup Operation)

Figure 22:
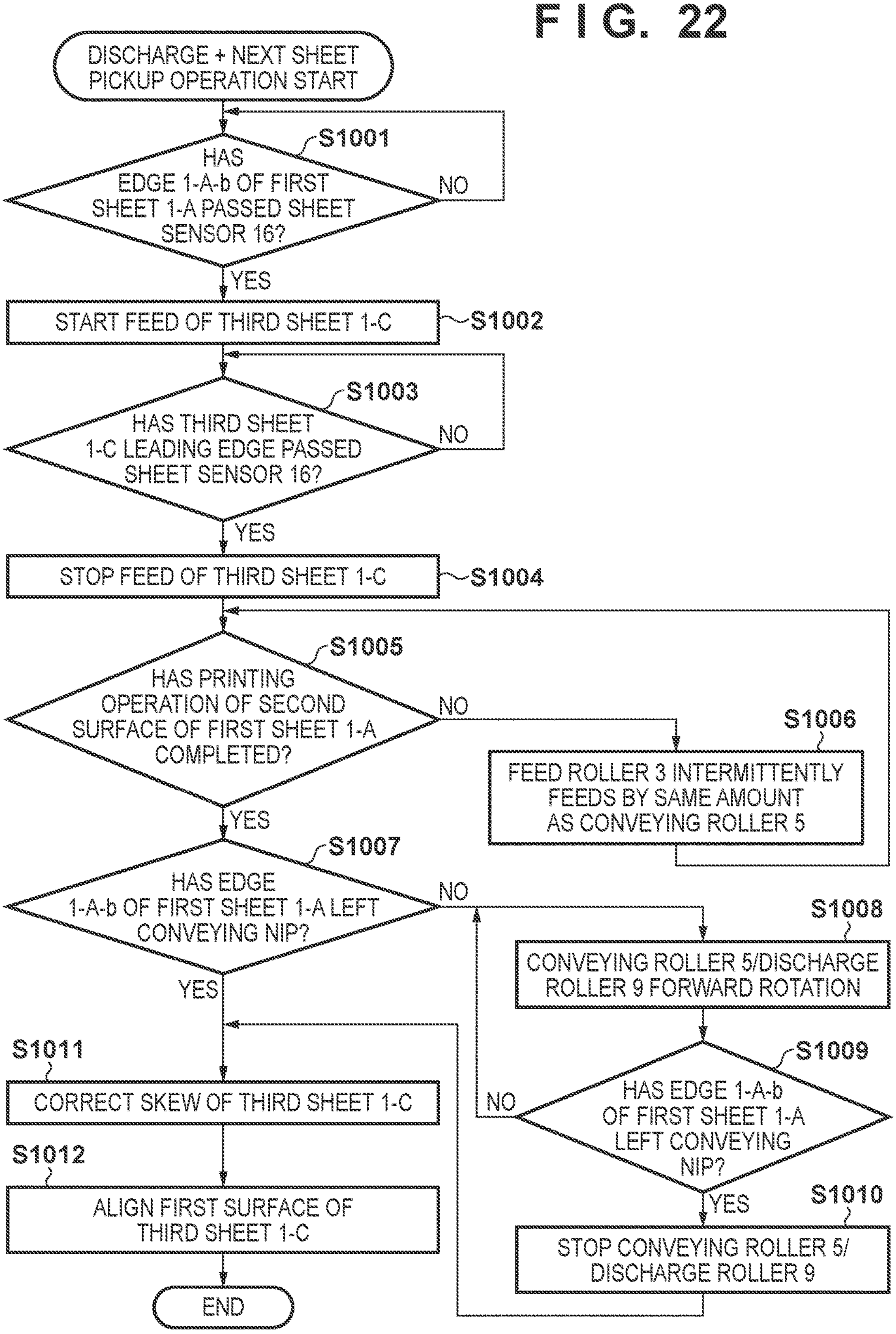
FIG. 22 is a flowchart of discharge+next sheet pickup according to the present invention.

FIG. 22 is a flowchart of the discharge+next sheet pickup operation. This step corresponds to step S713 in FIG. 19B.

In step S1001, the MPU 201 determines whether the sheet sensor 16 has detected the edge 1-A-b of the first sheet 1-A during the printing operation. If the sheet sensor 16 has detected the edge 1-A-b of the first sheet 1-A (YES in step S1001), the process advances to step S1002. If the sheet sensor 16 has not detected the edge 1-A-b of the first sheet 1-A (NO in step S1001), the conveying operation continues until the sheet sensor 16 detects the edge 1-A-b of the first sheet 1-A.

In step S1002, the MPU 201 controls the pickup roller 2 to pick up the third sheet 1-C, and the feed roller 3 to feed the third sheet 1-C toward the printhead 7.

In step S1003, the MPU 201 determines whether the sheet sensor 16 has detected the leading edge of the third sheet 1-C. If the sheet sensor 16 has detected the leading edge of the third sheet 1-C(YES in step S1003), the process advances to step S1004. If the sheet sensor 16 has not detected the leading edge of the third sheet 1-C(NO in step S1003), the conveyance of the third sheet 1-C continues.

In step S1004, the MPU 201 stops the feed roller 3 to temporarily stop the feed of the third sheet 1-C.

In step S1005, the MPU 201 determines whether the printing operation on the second surface of the first sheet 1-A is completed. If the printing operation on the second surface of the first sheet 1-A is completed (YES in step S1005), the process advances to step S1007. If the printing operation is not completed (NO in step S1005), the process advances to step S1006.

In step S1006, the MPU 201 controls the feed roller 3 to intermittently feed the third sheet 1-C by the same conveying amount as that of the conveying roller 5. Accordingly, the third sheet 1-C is conveyed following the first sheet 1-A while keeping constant the interval between the edge 1-A-b of the first sheet 1-A and the edge 1-C-b of the third sheet 1-C. The process then returns to step S1005.

In step S1007, the MPU 201 checks from information of the second sheet sensor 22 whether the edge 1-A-b of the first sheet 1-A has left the conveying nip between the conveying roller 5 and the pinch roller 6. If the edge 1-A-b of the first sheet 1-A has not left the conveying nip (NO in step S1007), the process advances to step S1008. If the edge 1-A-b of the first sheet 1-A has left the conveying nip (YES in step S1007), the process advances to step S1011.

In step S1008, the MPU 201 rotates the conveying roller 5 and the discharge roller 9 so that the edge 1-A-b of the first sheet 1-A leaves the conveying nip between the conveying roller 5 and the pinch roller 6.

In step S1009, the MPU 201 confirms whether the edge 1-A-b of the first sheet 1-A has left the conveying nip. If the edge 1-A-b of the first sheet 1-A has not left the conveying nip (NO in step S1009), the process returns to step S1008. If the edge 1-A-b of the first sheet 1-A has left the conveying nip (YES in step S1009), the process advances to step S1010.

In step S1010, the MPU 201 stops the conveying roller 5 and the discharge roller 9. Thereafter, the process advances to step S1011.

In step S1011, the MPU 201 corrects the skew of the third sheet 1-C.

In step S1012, the MPU 201 performs the alignment operation of the third sheet 1-C. At this time, the first sheet 1-A may be nipped between the discharge roller 9 and the spur 13, but is discharged outside the apparatus by the intermittent feed operation in the printing operation on the third sheet 1-C. After that, the processing sequence ends.

(Discharge+Reversing Feed Operation)

Figure 23:
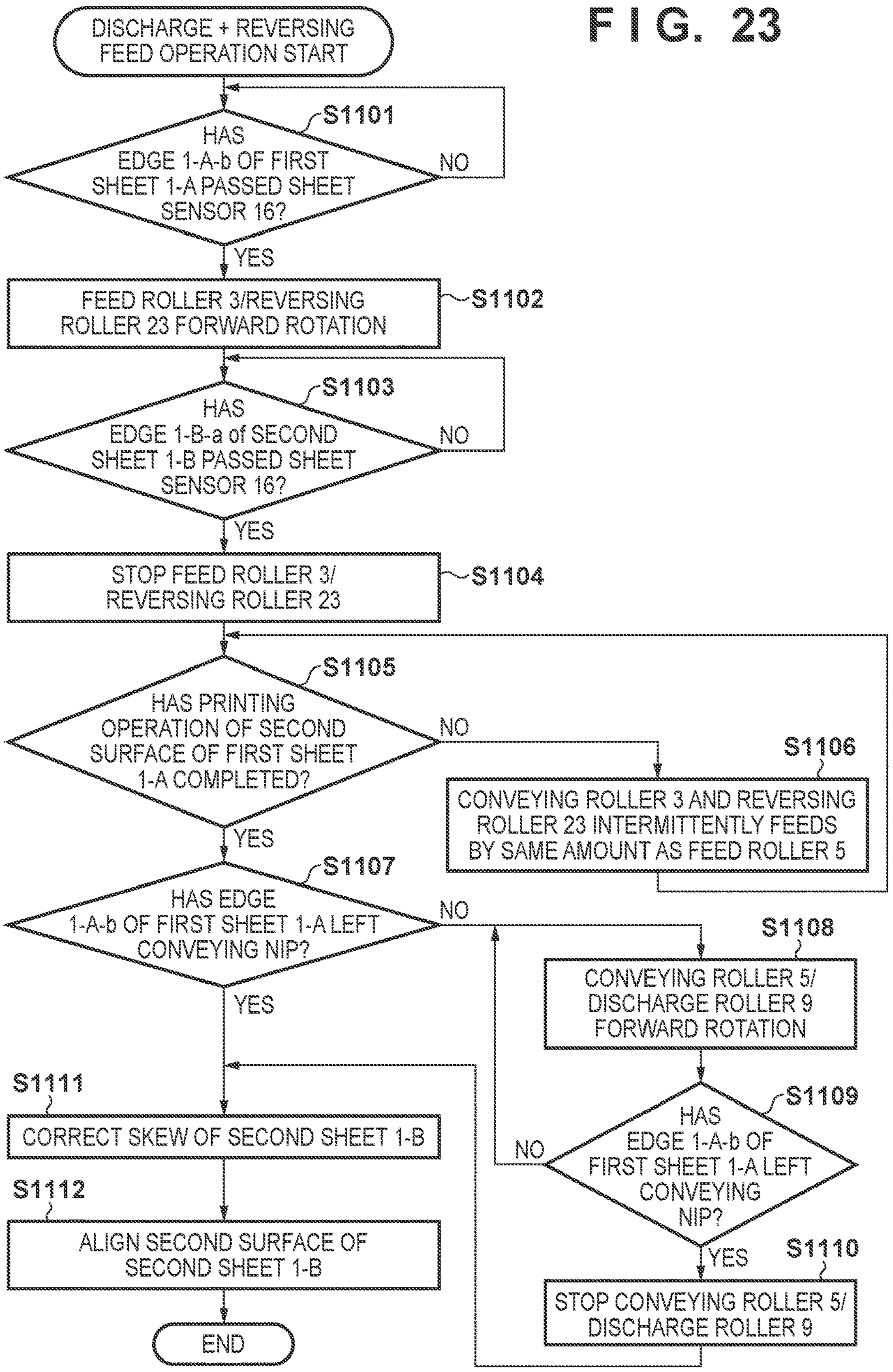
FIG. 23 is a flowchart of discharge+reversing feed according to the present invention.

FIG. 23 is a flowchart of the discharge+reversing feed operation. This operation corresponds to step S714 in FIG. 19B.

In step S1101, the MPU 201 determines whether the sheet sensor 16 has detected the edge 1-A-b of the first sheet 1-A during the printing operation. If the sheet sensor 16 has detected the edge 1-A-b of the first sheet 1-A (YES in step S1101), the process advances to step S1102. If the sheet sensor 16 has not detected the edge 1-A-b of the first sheet 1-A (NO in step S1101), the conveying operation continues until the sheet sensor 16 detects the edge 1-A-b of the first sheet 1-A.

In step S1102, the MPU 201 rotates the feed roller 3 and the reversing roller 23 so as to convey the second sheet 1-B downstream in the conveying direction, and starts feeding the second sheet 1-B.

In step S1103, the MPU 201 determines whether the sheet sensor 16 has detected the edge 1-B-a of the second sheet 1-B. If the sheet sensor 16 has detected the edge 1-B-a of the second sheet 1-B (YES in step S1103), the process advances to step S1104. If the sheet sensor 16 has not detected the edge 1-B-a of the second sheet 1-B (NO in step S1103), the conveyance continues until the sheet sensor 16 has detected the edge 1-B-a of the second sheet 1-B.

In step S1104, the MPU 201 stops the feed roller 3 and the reversing roller 23 to temporarily stop the feed of the second sheet 1-B.

In step S1105, the MPU 201 determines whether the printing operation on the second surface of the first sheet 1-A is completed. If the printing operation on the second surface of the first sheet 1-A is completed (YES in step S1105), the process advances to step S1107. If the printing operation is not completed (NO in step S1105), the process advances to step S1106.

In step S1106, the MPU 201 controls the feed roller 3 and the reversing roller 23 to intermittently feed the second sheet 1-B by the same conveying amount as that of the conveying roller 5. As a result, the second sheet 1-B is conveyed following the first sheet 1-A while keeping constant the interval between the edge 1-A-b of the first sheet 1-A and the edge 1-B-a of the second sheet 1-B. The process then returns to step S1105.

In step S1107, the MPU 201 checks from information of the second sheet sensor 22 whether the edge 1-A-b of the first sheet 1-A has left the conveying nip of the conveying roller 5. If the edge 1-A-b of the first sheet 1-A has not left the conveying nip (NO in step S1107), the process advances to step S1108. If the edge 1-A-b of the first sheet 1-A has left the conveying nip (YES in step S1107), the process advances to step S1111.

In step S1108, the MPU 201 rotates the conveying roller 5 and the discharge roller 9 so that the edge 1-A-b of the first sheet 1-A leaves the conveying nip between the conveying roller 5 and the pinch roller 6.

In step S1109, the MPU 201 confirms whether the edge 1-A-b of the first sheet 1-A has left the conveying nip. If the edge 1-A-b of the first sheet 1-A has not left the conveying nip (NO in step S1109), the process returns to step S1108. If the edge 1-A-b of the first sheet 1-A has left the conveying nip (YES in step S1109), the process advances to step S1110.

In step S1110, the MPU 201 stops the conveying roller 5 and the discharge roller 9. Then, the process advances to step S1111.

In step S1111, the MPU 201 corrects the skew of the second sheet 1-B.

In step S1112, the MPU 201 performs the alignment operation. At this time, the first sheet 1-A may be nipped between the discharge roller 9 and the spur 13, but is discharged outside the apparatus by the intermittent feed operation in the printing operation on the second sheet 1-B. After that, the processing sequence ends.

As described above, according to this embodiment, both high throughput of double-sided printing and a small apparatus size can be achieved in a printing apparatus capable of double-sided printing on a sheet.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-134475, filed Jul. 17, 2018, which is hereby incorporated by reference herein in its entirety.

What is claimed is:

1. A printing apparatus comprising:

a conveying path configured to convey a sheet;

a printing unit configured to print on the sheet conveyed through the conveying path;

a reversing path connected to the conveying path and configured to invert a first surface and a second surface of the sheet by conveying the sheet in a conveyance direction after the printing unit prints on the first surface of the sheet; and a control unit configured to control conveyance of a first sheet and a second sheet that is conveyed next to the first sheet, wherein the control unit controls to convey the first sheet and the second sheet to a downstream side of the reversing path in a state in which a trailing edge of the first sheet and a leading edge of the second sheet overlap with each other with respect to the conveyance direction within the downstream side of the reversing path and thereafter controls to convey the first sheet toward the printing unit to be separated from the second sheet, the leading edge of each sheet being the edge that first enters the reversing path.

2. The printing apparatus according to claim 1, wherein the printing unit prints on the second surface of the first sheet after the first sheet is separated from the second sheet.

3. The printing apparatus according to claim 2, wherein a third sheet is conveyed through the conveying path after printing on the second surface of the first sheet is completed and before printing on the second surface of the second sheet is started.

4. The printing apparatus according to claim 1, wherein the second sheet overlaps with the first sheet when the first sheet is in the reversing path.

5. The printing apparatus according to claim 2, wherein a skew correction operation of the first sheet is performed before printing on the second surface of the first sheet by the printing unit is started.

6. The printing apparatus according to claim 1, further comprising a first roller arranged in the conveying path and a second roller arranged in the reversing path.

7. The printing apparatus according to claim 6, wherein a skew correction operation of the first sheet is performed by abutting an edge of the first sheet against the first roller.

8. The printing apparatus according to claim 6, further comprising a third roller arranged in the conveying path and configured to convey the sheet to the first roller, wherein the first sheet conveyed through the reversing path reaches the third roller.

9. The printing apparatus according to claim 1, further comprising a pressing member arranged in the conveying path and configured to apply an external force in a first direction, wherein the second sheet is conveyed while overlapping with the first sheet in a predetermined area by being conveyed while receiving the external force from the pressing member.

10. The printing apparatus according to claim 1, further comprising a determination unit configured to determine whether or not sizes of the first sheet and the second sheet are a predetermined size, wherein the first sheet overlaps with the second sheet in a case that the sizes of the first sheet and the second sheet are the predetermined size.

11. The printing apparatus according to claim 10, wherein the predetermined size is defined in accordance with a length of the reversing path.

12. A method of controlling a printing apparatus including a conveying path configured to convey a sheet, a printing unit configured to print on the sheet conveyed through the conveying path, and a reversing path connected to the conveying path and configured to invert a first surface and a second surface of the sheet by conveying the sheet in a conveyance direction after the printing unit prints on the first surface of the sheet, the method comprising:

controlling conveyance of a first sheet and a second sheet that is conveyed next to the first sheet by controlling to convey the first sheet and the second sheet to a downstream side of the reversing path in a state in which a trailing edge of the first sheet and a leading edge of the second sheet overlap with each other with respect to the conveyance direction within the downstream side of the reversing path and thereafter controlling to convey the first sheet toward the printing unit to be separated from the second sheet, the leading edge of each sheet being the edge that first enters the reversing path.

13. The method according to claim 12, wherein the printing unit prints on the second surface of the first sheet after the first sheet is separated from the second sheet.

14. The method according to claim 13, wherein a third sheet is conveyed through the conveying path after printing on the second surface of the first sheet is completed and before printing on the second surface of the second sheet is started.

15. The method according to claim 12, wherein the second sheet overlaps with the first sheet when the first sheet is in the reversing path.

16. The method according to claim 13, wherein a skew correction operation of the first sheet is performed before printing on the second surface of the first sheet by the printing unit is started.

17. The printing apparatus according to claim 1, wherein in the overlapped state, the first surface of the first sheet has been printed by the printing unit and the first surface of the second sheet has been printed by the printing unit.

* * * * *